US012600907B2

(12) United States Patent
Yeh et al.

(10) Patent No.: US 12,600,907 B2
(45) Date of Patent: Apr. 14, 2026

(54) SEMICONDUCTOR QUANTUM DOT STRUCTURE AND METHOD FOR MAKING THE SAME

(71) Applicant: National Tsing Hua University, Hsinchu (TW)

(72) Inventors: Chang-Wei Yeh, Taoyuan (TW); Hsueh-Shih Chen, Hsinchu (TW); Cheng-Yang Chen, New Taipei (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 627 days.

(21) Appl. No.: 18/168,793

(22) Filed: Feb. 14, 2023

(65) Prior Publication Data

US 2024/0052241 A1     Feb. 15, 2024

(30) Foreign Application Priority Data

Aug. 11, 2022     (TW) .................................. 111130199

(51) Int. Cl.
| | |
|---|---|
| *C09K 11/88* | (2006.01) |
| *B82Y 20/00* | (2011.01) |
| *B82Y 40/00* | (2011.01) |
| *C09K 11/08* | (2006.01) |

(52) U.S. Cl.
CPC ........ *C09K 11/883* (2013.01); *C09K 11/0883* (2013.01); *B82Y 20/00* (2013.01); *B82Y 40/00* (2013.01)

(58) Field of Classification Search
CPC .......................... C09K 11/883; C09K 11/0883
See application file for complete search history.

(56) References Cited

U.S. PATENT DOCUMENTS

| | | | |
|---|---|---|---|
| 11,685,861 B2 * | 6/2023 | Yeh ........................ | C09K 11/02 252/301.6 S |
| 2020/0283680 A1 | 9/2020 | Jun et al. | |
| 2022/0267672 A1 * | 8/2022 | Yeh ...................... | C09K 11/883 |

FOREIGN PATENT DOCUMENTS

| | | | |
|---|---|---|---|
| CN | 109929552 A | | 6/2019 |
| CN | 111201302 A | | 5/2020 |
| TW | 1741954 B | * | 10/2021 |
| WO | 2019215059 A1 | | 11/2019 |

OTHER PUBLICATIONS

B. F. P. McVey et al., "Unraveling the role of zinc complexes on indium phosphide nanocrystal chemistry," J. Chem. Phys., vol. 151, pp. 191102-1~191102-7, 2019.

* cited by examiner

*Primary Examiner* — C Melissa Koslow
(74) *Attorney, Agent, or Firm* — HSML P.C.

(57) ABSTRACT

A semiconductor quantum dot structure includes a core and a shell. The core includes a seed crystal made of a first compound M1C1, a core layer, and a barrier layer grown in such order. The seed crystal has first regions that are inactive with oxygen, and second regions that are easily reactive with oxygen. The core layer is made of the first compound M1C1, and has first and second areas. Each of the first areas is positioned on a corresponding one of the first regions. Each of the second areas is positioned on a corresponding one of the second regions. Each of the first areas has a thickness greater than that of each of the second areas. The barrier layer is made of a second compound selected from M1X1 and X2C1. The shell is grown on the barrier layer, and is made of a third compound M2C2.

20 Claims, 11 Drawing Sheets

UV-vis (Core)

SEMICONDUCTOR QUANTUM DOT STRUCTURE AND METHOD FOR MAKING THE SAME

CROSS-REFERENCE TO RELATED APPLICATION

This application claims priority to Taiwanese Invention Patent Application No. 111130199, filed on Aug. 11, 2022.

FIELD

The present disclosure relates to a quantum dot structure, and more particularly to a semiconductor quantum dot structure. The present disclosure also relates to a method for making the semiconductor quantum dot structure.

BACKGROUND

Group II-VI semiconductor compounds (e.g., zinc sulfide (ZnS) and cadmium sulfide (CdS)) and group III-V semiconductor compounds (e.g., indium phosphide (InP)) processed to form semiconductor nanocrystals are known as quantum dots. By adjusting the dimension and composition of the quantum dots, energy barrier of the quantum dots can be adjusted accordingly, so that the quantum dots can emit radiation energy having specific wavelengths after excitation by light or electrical energy. Therefore, in recent years, quantum dots are widely utilized in flat panel display devices, light-emitting devices, optical sensors, biological imaging devices, etc.

It has been reported that quantum dots are very sensitive to external environment due to their large surface-to-volume ratio. In addition, the surface ligands on the quantum dots, which are organic substances, are easily detached from surfaces of the quantum dots, which causes oxidation of the quantum dots and a decrease in quantum yield. Therefore, in recent years, studies on quantum dots mainly focuses on methods for preparing quantum dots with improved quantum yield, e.g., most prior art documents disclose use of etchants in an etching process to remove an oxide layer on the surface of quantum dots so as to solve the aforesaid oxidation issue. However, the extremely small size of the quantum dots makes it difficult to control the etching process using the etchants, resulting in the quantum dots having uneven particle size distribution.

Yu-Ho Won et al., in an article entitled "Highly efficient and stable INP/ZnSe/ZnS quantum dot light-emitting diodes" published in *Nature,* 2019, Vol. 575, p. 634-638, discloses a method for making InP/ZnSe/ZnS quantum dots to be described as follows. First, a mixture solution containing a precursor of In and a precursor of P is subjected to a nucleation reaction at 260° C. for 40 minutes to synthesize InP cores. After that, the InP cores were cooled to room temperature, and then acetone is added to precipitate the InP cores, followed by centrifugation to collect the InP cores. The thus collected InP cores are dispersed in toluene, and then a precursor of Zn is added thereinto at 180° C., followed by injection of a diluted hydrogen fluoride (HF) solution (concentration: 10 wt %; volume: 10 mL) to inhibit oxidation on the surfaces of the InP cores, so as obtain another mixture solution. Afterwards, the another mixture solution is heated to a temperature ranging from 320° C. to 340° C., and a precursor of Zn and a precursor of Se are sequentially added thereinto for 1 hour so as to grow a ZnSe shell on the InP core. Thereafter, a precursor of Zn and a precursor of S are added into the another mixture solution for reaction for 20 minutes, so as to grow a ZnS shell on the ZnSe shell, thereby obtaining a solution containing InP/ZnSe/ZnS core-shell-shell quantum dots. Finally, the solution containing InP/ZnSe/ZnS core-shell-shell quantum dots is cooled to room temperature, followed by addition of ethanol and centrifugation at 5800 rpm for 5 minutes in order to precipitate and collect the InP/ZnSe/ZnS core-shell-shell quantum dots. The thus collected InP/ZnSe/ZnS core-shell-shell quantum dots are then dispersed in octane. During the formation of the ZnSe shell and ZnS shell at 320° C., a thickness of the ZnSe/ZnS shell increases (i.e., the ZnSe shell increases about 3.5 nm in thickness, and the ZnS shell increases about 0.3 nm in thickness), and each of the quantum dot nanocrystals has an irregular appearance and the quantum yield thereof decreases from 98% to 75%. Although oxidation on the surfaces of the InP cores could be inhibited by introducing the diluted HF solution before growth of the ZnSe shell and the ZnS shell, the diluted HF solution releases toxic gases at high temperature, resulting in such method for making the InP/ZnSe/ZnS core-shell-shell quantum dots having a high risk of danger.

In order to reduce the risk of danger caused by the release of toxic gases, the applicants disclose in Taiwanese Invention Patent No. TW 1741954 B (i.e., a counterpart application of US Patent Application Publication No. US 2022/0267672 A1), a quantum dot structure with good stability and a method for making the same. Referring to FIG. 1, the quantum dot structure 1 includes an InP core 11, a plurality of ZnSe inner shells 12, a plurality of ZnSe first outer shells 13, and a plurality of ZnSe second outer shells 14. The InP core 11 has a plurality of crystal planes of {111} which are inactive with oxygen and a plurality of crystal planes of {112} which are easily reactive with oxygen. Each of the ZnSe inner shells 12 is grown on a corresponding one of the crystal planes of {111} with are inactive with oxygen, each of the ZnSe first outer shells 13 is grown on a corresponding one of the ZnSe inner shells 12, and each of the ZnSe second outer shells 14 is grown on a corresponding one of the crystal planes of {112} which are easily reactive with oxygen to be connected to adjacent ones of the ZnSe first outer shells 13.

As disclosed in TW I741954 B, the method for making the quantum dot structure 1 includes: after forming the InP core 11, growing each of the ZnSe inner shells 12 on a corresponding one of the crystal planes of {111} of the InP core 11 which is inactive with oxygen to obtain InP core 11/ZnSe inner shells 12, and then introducing a fluoride-containing organic salt (e.g., ammonium fluoride (NH₄F)) serving as an etchant during an etching process so as to etch an oxide layer formed on a corresponding one of the crystal planes of {112} of the InP core 11 which is easily reactive with oxygen; after the crystal planes of {112} of the InP core 11 is exposed, diluting the etchant to terminate the etching process of the oxide layer; filtering the thus etched InP core 11/ZnSe inner shells 12; adding the thus filtered InP core 11/ZnSe inner shells 12 into a dispersant-containing solution, followed by left to stand for a predetermined time, so that residue of the etchant leaves the InP core 11/ZnSe inner shells 12; filtering the InP core 11/ZnSe inner shells 12 to remove residue of the etchant therefrom; and growing the ZnSe first outer shells 13 and the ZnSe second outer shells 14 on the InP core 11/ZnSe inner shells 12, thereby obtaining the quantum dot structure 1. Since TW I741954 B teaches use of the fluoride-containing organic salt with a relatively mild reactivity as the etchant to reduce the risk of danger caused by the release of toxic gases, and also teaches growth of each of the ZnSe inner shells 12 on the corresponding one of the crystal planes of {111} of the InP core 11 which is inactive with oxygen to prevent the InP core 11 from being etched by the etchant during the etching process, the particle size distribution of the thus obtained quantum dot structures 1 can be effectively controlled.

In spite of the aforesaid, there is still a need for those skilled in the art to develop a method for preparing quantum dots which have excellent stability and high quantum yield.

SUMMARY

Therefore, an object of the present disclosure is to provide a semiconductor quantum dot structure that can alleviate at least one of the drawbacks of the prior art.

According to an aspect of the present disclosure, the semiconductor quantum dot structure includes a core and a shell. The core includes a seed crystal, a core layer, and a barrier layer. The seed crystal is made of a first compound M1C1, and has a crystal surface having a plurality of first regions and a plurality of second regions. Each of the first regions is inactive with oxygen, and each of the second regions is easily reactive with oxygen. The core layer is grown on the seed crystal, is made of the first compound M1C1, and has a plurality of first areas and a plurality of second areas. Each of the first areas is positioned on a corresponding one of the first regions of the crystal surface. Each of the second areas is positioned on a corresponding one of the second regions of the crystal surface. Each of the first areas has a thickness that is greater than that of each of the second areas. The barrier layer is grown on the core layer, and is made of a second compound selected from the group consisting of M1X1 and X2C1. The shell is grown on the barrier layer to enclose the core, and is made of a third compound M2C2. M1 is a group III element selected from the group consisting of Al, Ga, In, and combinations thereof, and C1 is a group V element selected from the group consisting of P, As, and a combination thereof. X1 is an element selected from the group consisting of N, As, S, Se, Te, F, Cl, Br, and I, and X2 is an element selected from the group consisting of Na, K, Cs, Mg, Cu, Zn, Cd, Hg, Al, Ga, and Pb. M2 is a group II element selected from the group consisting of Zn, Cd, and a combination thereof, and C2 is a group VI element selected from the group consisting of S, Se, O, Te, and combinations thereof.

According to another aspect of the present disclosure, a method for making semiconductor quantum dot structures includes the steps of:

(a) mixing a solution containing a precursor of M1 with a solution containing a precursor of C1 to form a first mixture solution;

(b) heating the first mixture solution to a first temperature not lower than a nucleation temperature of a first compound M1C1 for a first predetermined time period so as to form a plurality of seed crystals of the first compound M1C1 in the first mixture solution, each of the seed crystals having a crystal surface that has a plurality of first regions and a plurality of second regions, each of the first regions being inactive with oxygen, each of the second regions being oxidized by oxygen present in the first mixture solution so as to form an oxide layer thereon;

(c) forming a second mixture solution by continuously adding an additional solution containing the precursor of M1, an addition solution containing the precursor of C1, and a first diluted fluoride-containing etchant into the first mixture solution obtained after step (b) for a second predetermined time period, while keeping at the first temperature, so as to permit the oxide layer formed on each of the second regions of the seed crystals to be etched by the first diluted fluoride-containing etchant, and so as to grow a plurality of core layers respectively on the seed crystals, each of the core layers having a plurality of first areas and a plurality of second areas, the first areas of each of the core layers being respectively grown on the first regions of a corresponding one of the seed crystals, the second areas of each of the core layers being respectively grown on the second regions of a corresponding one of the seed crystals, each of the first areas having a thickness greater than that of each of the second areas, the first diluted fluoride-containing etchant having a concentration ranging from 1 vol % to 5 vol % and a volume ranging from 0.1 mL to 2 mL;

(d) forming a third mixture solution by continuously adding a solution containing a precursor of X1 or a solution containing a precursor of X2 into the second mixture solution obtained after step (c) for a third predetermined time period so as to allow growth of a plurality of barrier layers respectively on the core layers, thereby obtaining, in the third mixture solution, a plurality of cores each including one of the seed crystals, a corresponding one of the core layers and a corresponding one of the barrier layers, each of the barrier layers being made of a second compound selected from the group consisting of M1X1 and X2C1;

(e) removing the cores from the third mixture solution and dispersing the cores in a clear solution including a precursor of M2 so as to obtain a clear solution including the cores and the precursor of M2; and (f) heating the clear solution including the cores and the precursor of M2 to a second temperature not lower than a nucleation temperature of a third compound M2C2, and then adding a solution containing a precursor of C2, so as to grow a plurality of shells respectively on the barrier layers of the cores, thereby obtaining the semiconductor quantum dot structures each including one of the cores and a corresponding one of the shells.

In the method for making the semiconductor quantum dot structures of the present disclosure, M1 is a group III element selected from the group consisting of Al, Ga, In, and combinations thereof, and C1 is a group V element selected from the group consisting of P, As, and a combination thereof. X1 is an element selected from the group consisting of N, As, S, Se, Te, F, Cl, Br, and I, and X2 is an element selected from the group consisting of Na, K, Cs, Mg, Cu, Zn, Cd, Hg, Al, Ga, and Pb. M2 is a group II element selected from the group consisting of Zn, Cd, and a combination thereof, and C2 is a group VI element selected from the group consisting of S, Se, O, Te, and combinations thereof.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
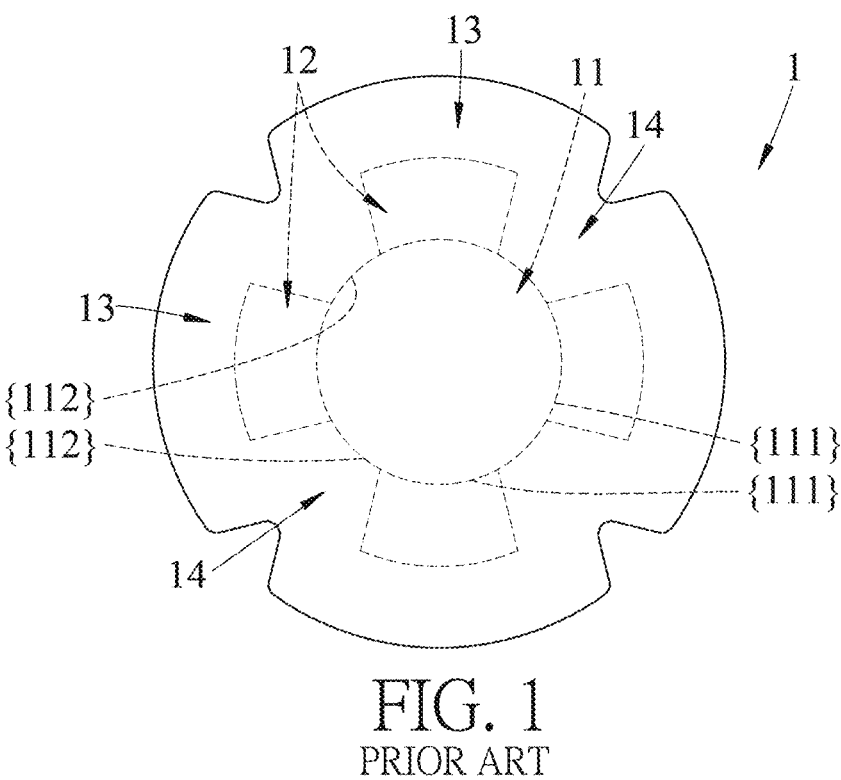
FIG. 1 is a schematic view illustrating a conventional quantum dot structure disclosed in Taiwanese Invention Patent No. TW 1741954 B.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
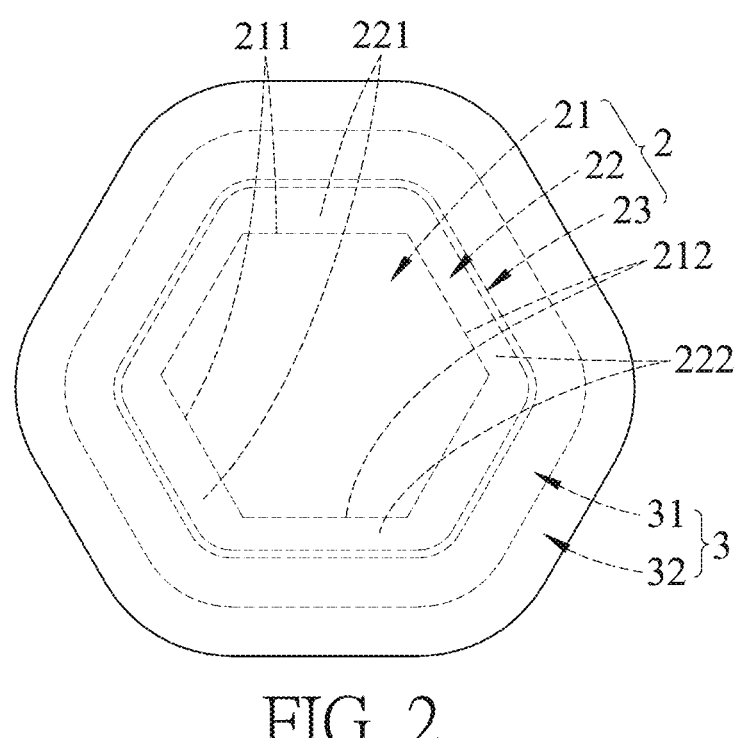
FIG. 2 is a schematic view illustrating an embodiment of a semiconductor quantum dot structure according to the present disclosure.

Referring to FIG. 2, an embodiment of a semiconductor quantum dot of the present disclosure includes a core 2 and a shell 3.

The core 2 includes a seed crystal 21 made of a first compound M1C1 (hereinafter "seed crystal 21 of M1C1"), a core layer 22 made of the first compound M1C1 (hereinafter "core layer 22 of M1C1"), and a barrier layer 23.

The seed crystal 21 of M1C1 has a crystal surface having a plurality of a first regions 211 and a plurality of second regions 212. Each of the first regions 211 is inactive with oxygen, and each of the second regions 212 is easily reactive with oxygen.

The core layer 22 of M1C1 is grown on the seed crystal 21 of M1C1, and has a plurality of first areas 221 and a plurality of second areas 222. Each of the first areas 221 of the core layer 22 of M1C1 is positioned on a corresponding one of the first regions 211 of the crystal surface of the seed crystal 21 of M1C1, and each of the second areas 222 of the core layer 22 of M1C1 is positioned on a corresponding one of the second regions 212 of the crystal surface of the seed crystal 21 of M1C1. As shown in FIG. 2, in the core layer 22 of M1C1, each of the first areas 221 has a thickness that is greater than that of each of the second areas 222.

The barrier layer 23 is grown on the core layer 22 of M1C1, and is made of a second compound selected from the group consisting of M1X1 and X2C1.

The shell 3 is made of a third compound M2C2 (hereinafter "shell 3 of M2C2"), and is grown on the barrier layer 23 to enclose the core 2.

In certain embodiments, M1 is a group III element selected from the group consisting of Al, Ga, In, and combinations thereof, and C1 is a group V element selected from the group consisting of P, As, and a combination thereof. In certain embodiments, X1 is an element selected from the group consisting of N, As, S, Se, Te, F, Cl, Br, and I, and X2 is an element selected from the group consisting of Na, K, Cs, Mg, Cu, Zn, Cd, Hg, Al, Ga, and Pb. In certain embodiments, M2 is a group II element selected from the group consisting of Zn, Cd, and a combination thereof, and C2 is a group VI element selected from the group consisting of S, Se, O, Te, and combinations thereof.

According to the present disclosure, the overall structure of the seed crystal 21 of M1C1 and the core layer 22 of M1C1 may contribute to an increase in the particle size of the semiconductor quantum dot structure, so as to adjust the emission wavelength band and to increase absorption of the semiconductor quantum dot structure in the visible light spectrum. In addition, the thickness of the shell 3 of the semiconductor quantum dot structure is determined by time period of growth of the shell 3 and amount of precursors involved in a reaction for forming the same, and thus, when the time period for growing the shell 3 is relatively long, the amount of precursors involved in such reaction will be relatively greater, which will result in the shell 3 being formed with a relatively greater thickness. According to the present disclosure, the barrier layer 23 has a function of blocking diffusion of group II and group VI elements of the shell 3 of M2C2 into the core layer 22 of M1C1 and diffusion of group Ill and group V elements of the core layer 22 of M1C1 into the shell 3 of M2C2, and thus prevents these elements from being alloyed which may cause decrease in structure strength of the core 2 and the shell 3, thereby avoiding widening of full width at half maximum (FWHM) value and decrease in quantum yield.

In certain embodiments, the seed crystal 21 of M1C1 has a particle size ranging from 1.5 nm to 4.5 nm, the core layer 22 of M1C1 has an average thickness ranging from 0.1 nm to 1.0 nm, the barrier layer 23 has a thickness ranging from 0.1 nm to 1.0 nm, and the semiconductor quantum dot structure has a particle size ranging from 6 nm to 20 nm. In other embodiments, the seed crystal 21 of M1C1 has a particle size ranging from 1.5 nm to 2.5 nm, and the semiconductor quantum dot structure has a particle size ranging from 6 nm to 16 nm.

In an exemplary embodiment, the first compound M1C1 for making the seed crystal 21 and the core layer 22 is InP, and the third compound M2C2 for making the shell 3 is one of ZnSe, ZnSeS, ZnS, and combinations thereof. In certain embodiments, the second compound for making the barrier layer 23 is M1X1. In an exemplary embodiment, when X1 of the second compound M1X1 is Se, the In in the core layer 22 of InP and the Se of the barrier layer 23 will react to form $In_xSe_y$. In other embodiments, the second compound for making the barrier layer 23 is X2C1. In another exemplary embodiment, when X2 of the second compound X2C1 is Zn or Cd, the P in the core layer 22 of InP and the Zn or Cd in the barrier layer 23 will react to form $Zn_xP_y$ or $Cd_xP_y$.

In certain embodiments, in the seed crystal 21 of M1C1, each of the first regions 211 that is inactive with oxygen has a crystal plane of {111}, and each of the second regions 212 that is easily reactive with oxygen has at least one of the crystal planes of {311}, {220}, and {200}. It should be noted that, since the applicants, in Taiwanese Invention Patent No. TW 1741954 B, have disclosed that in the seed crystal of M1C1, the crystal plane of {111} is inactive with oxygen whereas the crystal planes of {311}, {220}, and {200} are easily reactive with oxygen by X-ray photoelectron spectrum (XPS) analysis and X-ray diffraction (XRD) analysis, further details thereof are not provided herein for the sake of brevity.

In certain embodiments, the shell 3 of M2C2 has a layered structure, in which the third compound M2C2 is selected from ZnSe/ZnS and ZnSeS/ZnS. In an exemplary embodiment, when the third compound M2C2 is ZnSe/ZnS, the layered structure of the shell 3 includes an inner shell layer 31 of ZnSe and an outer shell layer 32 of ZnS which are formed on the barrier layer 23 in such order and in a direction away from the seed crystal 21 of InP. In another exemplary embodiment, when the third compound M2C2 is ZnSeS/ZnS, the layered structure of the shell 3 includes the inner shell layer 31 of ZnSeS and the outer shell layer 32 of ZnS which are formed on the barrier layer 23 in such order and in a direction away from the seed crystal 21 of InP. In yet another exemplary embodiment, Se and S in the inner shell layer 31 of ZnSeS formed on the barrier layer 23 may be distributed in a gradient manner in a direction away from the seed crystal 21 of InP. In still yet another exemplary embodiment, Se and S may be evenly distributed to form an alloy with Zn in the inner shell layer 31 of ZnSeS formed on the barrier layer 23.

An embodiment of a method for making the semiconductor quantum dot structures according to the present disclosure includes the following steps (a) to (f).

In step (a), a solution containing a precursor of M1 is mixed with a solution containing a precursor of C1 to form a first mixture solution.

In step (b), the first mixture solution is heated to a first temperature not lower than a nucleation temperature of the first compound M1C1 for a first predetermined time period so as to form a plurality of the seed crystals 21 of the first compound M1C1 in the first mixture solution. Each of the seed crystals 21 has the crystal surface that has the first regions 211 and the second regions 212. Each of the first regions 211 is inactive with oxygen, and each of the second regions 212 is oxidized by oxygen present in the first mixture solution so as to form an oxide layer thereon (not shown in figures).

In step (c), while keeping at the first temperature, a second solution mixture is formed by continuously and simultaneously adding an additional solution containing the precursor of M1, an additional solution containing the precursor of C1, and a first diluted fluoride-containing etchant into the first mixture solution containing the seed crystals 21 of M1C1 obtained after step (b) for a second predetermined time period, so as to permit the oxide layer formed on each of the second regions 212 of the seed crystals 21 of M1C1 to be etched by the first diluted fluoride-containing etchant, and so as to grow a plurality of the core layers 22 of M1C1 respectively on the seed crystals 21 of M1C1, thereby obtaining a plurality of preformed cores each including one of the seed crystals 21 of M1C1 and a corresponding one of the core layers 22 of M1C1. Each of the core layers 22 of M1C1 has the first areas 221 and the second areas 222. In this step, the first areas 221 of each of the core layers 22 of M1C1 are respectively grown on the first regions 211 of a corresponding one of the seed crystals 21 of M1C1, and after the oxide layer on each of the second regions 212 of the seed crystals 21 of M1C1 is etched by the first diluted fluoride-containing etchant, the second areas 222 of each of the core layers 22 of M1C1 are respectively grown on the second regions 212 of a corresponding one of the seed crystals 21 of M1C1. The first diluted fluoride-containing etchant has a concentration ranging from 1 vol. % to 5 vol. % and a volume ranging from 0.1 mL to 2.0 mL. Although the additional solution containing the precursor of M1, the additional solution containing the precursor of C1, and the first diluted fluoride-containing etchant were continuously and simultaneously added into the first mixture solution containing the seed crystals 21 of M1C1 obtained after step (b), each of the first areas 221 has a thickness greater than that of each of the second areas 222 during growth of the core layers 22 of M1C1 respectively on the seed crystals 21 of M1C1. This is because each of the first regions 211 of the seed crystals 21 of M1C1 is inactive with oxygen and thus lacked of an oxide layer formed thereon due to etching by the first diluted fluoride-containing etchant, whereas each of the second regions 212 of the seed crystals 21 of M1C1 is easily reactive with oxygen and thus is easily formed with the oxide layer thereon.

It should be noted that in step (c), since the first diluted fluoride-containing etchant may be added into the first mixture solution obtained after step (b) at the nucleation temperature of the first compound M1C1 at appropriate concentration range (1 vol. % to 5 vol. %) and volume range (0.1 mL to 2.0 mL) as described above, the risk of danger caused by the first diluted fluoride-containing etchant in this step can be reduced. Therefore, in order to further reduce the risk of danger, in this step, the first diluted fluoride-containing etchant is added into the first the mixture solution obtained after step (b) at a flow rate ranging from 0.15 mL/hour to 3.0 mL/hour.

In step (d), a third mixture solution is formed by continuously adding a solution containing a precursor of X1 or a solution containing a precursor of X2 into the second mixture solution containing the preformed cores obtained after step (c) for a third predetermined time period so as to allow growth of a plurality of the barrier layers 23 respectively on the core layers 22 of M1C1, thereby obtaining a plurality of cores 2 each including one of the seed crystals 21 of M1C1, a corresponding one of the core layers 22 of M1C1, and a corresponding one of the barrier layers 23 which is made of the second compound selected from the group consisting of M1X1 and X2C1.

In step (e), the cores 2 in the third mixture solution obtained after step (d) are first subjected to a purification treatment. To be specific, an organic solvent is introduced into the third mixture solution obtained after step (d), followed by a centrifugation process to collect the cores 2 so as to remove the cores 2 therefrom. The thus collected cores 2 were dispersed in another organic solvent. According to the present disclosure, the organic solvent may be a mixture of toluene and acetone, and the another organic solvent is toluene. Meanwhile, a cloudy solution containing a precursor of M2 is heated at a predetermined temperature until such solution becomes a clear solution containing the precursor of M2. Thereafter, the another organic solvent containing the cores 2 are added to the clear solution containing the precursor of M2 at the predetermined temperature so as to evaporate the another organic solvent therefrom, leaving the clear solution containing the precursor of M2 and the cores 2.

In step (f), the clear solution containing the precursor of M2 and the cores 2 obtained after step (e) is heated to a second temperature not lower than a nucleation temperature of the third compound M2C2, followed by adding a solution containing a precursor of C2, so as to grow a plurality of the shells 3 respectively on the barrier layers 23 of the cores 2, thereby obtaining the semiconductor quantum dot structures each including one of the cores 2 and a corresponding one of the shells 3.

In some embodiments, the method further includes step (e1) which is performed between step (e) and step (f). In step (e1), a second-diluted fluoride-containing etchant is added into the clear solution containing the precursor of M2 and the cores 2 so as to remove an oxide layer (not shown in figures) formed on a surface of each of the barrier layers 23 of the cores 2, thereby achieving surface reorganization. In certain embodiments, the second-diluted fluoride-containing etchant has a concentration ranging from 1 vol. % to 10 vol. %, and is added in an amount ranging from 0.05 mL to 1.0 mL into the clear solution containing the precursor of M2 and the cores 2.

As described in the foregoing, the overall structure of each of the preformed cores (each including one of the seed crystals 21 of M1C1 and a corresponding one of the core layers 22 of M1C1) may contribute to the increase in the particle size of a corresponding one of the semiconductor quantum dot structures, and by the method of the present disclosure, the cores 2 of the semiconductor quantum dot structures free from oxidation can be obtained, so as to adjust the emission wavelength band and to increase absorption of the semiconductor quantum dot structures in the visible light spectrum for improving quantum efficiency. Therefore, the thus absorbed visible light can be effectively emitted from the semiconductor quantum dot structures. In addition, the shell 3 may be grown for a long time period under a high temperature, which will lead to diffusion of group II and group VI elements of the shell 3 of M2C2 into the core layer 22 of M1C1 and diffusion of group Ill and group V elements of the core layer 22 of M1C1 into the shell 3 of M2C2, causing these elements to be alloyed and results in decrease of quantum yield and widening of FWHM value. In order to avoid the diffusion of these elements and generation of alloys of these elements, in certain embodiments, the first predetermined time period in step (b) is not greater than 60 minutes, the second predetermined time period in step (c) ranges from 1 minute to 40 minutes, and the third predetermined time period in step (d) ranges from 1 minute to 40 minutes. In some embodiments, the first predetermined time period in step (b) is not greater than 15 minutes.

According to the present disclosure, each of the first diluted fluoride-containing etchant and the second diluted fluoride-containing etchant includes a compound selected from the group consisting of HF, ZnF, and NH$_4$F.

In certain embodiments, the first compound M1C1 of each of the seed crystals 21 and the core layers 22 is InP, so as to obtain seed crystals 21 of InP and core layers 22 of InP; the third compound M2C2 of each of the shells 3 is one of ZnSe, ZnSeS, ZnS, and combinations thereof; X1 of the second compound M1X1 is Se, and X2 of the second compound X2C1 is Zn or Cd.

In certain embodiments, in step (e), the precursor of M2 in the clear solution is a precursor of Zn, and in step (f), the precursor of C2 in the solution includes a precursor of Se and a precursor of S.

According to the present disclosure, each of the shells 3 includes the inner shell layer 31 and the outer shell layer 32.

Step (f) includes sub-steps (f1) and (f2) performed in such order.

In this embodiment, in sub-step (f1), a solution containing the precursor of Se is added at the nucleation temperature of the third compound into the clear solution containing the precursor of Zn and the cores 2 obtained after step (e) or step (e1) to form a fourth mixture solution, such that in the fourth mixture solution, Se in the precursor of Se completely reacts with Zn in the precursor of Zn to allow growth of the inner shell layer 31 of ZnSe on each of the barrier layers 23 of the cores 2.

In sub-step (f2), a solution containing the precursor of S is added at the nucleation temperature of the third compound into the fourth mixture solution obtained after step (f1) to form a fifth mixture solution, such that in the fifth mixture solution, S in the precursor of S completely reacts with Zn in the precursor of Zn to allow growth of the outer shell layer 32 of ZnS on the inner shell layer 31 of ZnSe.

The steps in another embodiment of the method are substantially the same as those of this embodiment, except for the following differences.

In the another embodiment of the method, in sub-step (f1), a solution containing the precursor of Se and the precursor of S is added at the nucleation temperature of the third compound into the clear solution containing the precursor of Zn and the cores 2 obtained after step (e) or step (e1) to form a fourth mixture solution, such that in the fourth mixture solution, Se in the precursor of Se and S in the precursor of S completely react with Zn in the precursor of Zn to allow growth of the inner shell layer 31 of ZnSeS on each of the barrier layers 23 of the cores 2. In addition, in sub-step (f1), a molar ratio of Se to S in the fourth mixture solution is 2:1, and Se and S in the inner shell layer 31 of ZnSeS formed on each of the barrier layers 23 are distributed in a gradient manner in a direction away from a corresponding one of the seed crystals 21 of InP. Thereafter, in the another embodiment of the method, in sub-step (f2), the outer shell layer 32 of ZnS is grown on the inner shell layer 31 of ZnSeS.

The steps in yet another embodiment of the method are substantially the same as those of the another embodiment, except that, in sub-step (f1), a molar ratio of Se to S in the fourth mixture solution is 1:1, and Se and S are evenly distributed to form an alloy with Zn in the inner shell layer 31 of ZnSeS formed on each of the barrier layers 23.

The present disclosure will be described by way of the following examples. However, it should be understood that the following examples are intended solely for the purpose of illustration and should not be construed as limiting the present disclosure in practice.

EXAMPLES

General Experimental Materials:

1. Toluene ($C7H_8$; purity: >99%), methanol ($CH_3OH$; purity: >99%), and acetone (($CH_3)_2CO$; purity: 99.5%) were purchased from Echo Chemical Co., Ltd.

2. Zinc acetate ($Zn(OAc)_2$; purity: 99.99%), zinc stearate ($Zn(SA)_2$; purity: 10%-12%), octadecene (ODE; purity: 90%), oleic acid (OA; purity: 90%), cadmium oxide (CdO; purity: 99.99%), selenium (Se) powder (purity: 99.99%), and hydrofluoric acid (HF; concentration: 48%; ACS reagent) were purchased from Sigma-Aldrich.

3. Indium acetate ($In(OAc)_3$; purity: 99.99%), trioctylphosphine (TOP; purity: 90%), sulfur (S) powder (purity: 99.5%), and ammonium fluoride ($NH_4F$; purity: 98%) were purchased from Alfa Aesar.

4. Tris(trimethylsilyl)phosphine (($TMS)_3P$; purity: 98%) was purchased from DALCHEM, Russia.

Example 1 (EX1)

Preparation of Precursor Solutions
1. Preparation of a Solution Containing a Precursor of In $In(OAc)_3$ (18 mmol), OA (55.8 mmol), and ODE (180 mL) were mixed in a three-neck round-bottom flask (flask volume: 250 mL) to form a cloudy solution, which was evacuated at 150° C. until the cloudy solution became a clear solution, followed by cooling to room temperature, thereby obtaining a solution containing a precursor of In (0.1 M).
2. Preparation of a Solution Containing a Precursor of P $(TMS)_3P$ (1 mmol) and TOP (20 mL) were mixed in a volumetric flask to form a solution containing a precursor of P (0.05 M).

3. Preparation of a First Diluted HF Etchant Solution

HF and acetone were mixed to form a first diluted HF etchant solution having a concentration of 5 vol. %.
4. Preparation of a Solution Containing a Precursor of Zn $Zn(OAc)_3$ (25 mmol), OA (50 mmol), and ODE (34 mL) were mixed in a three-neck round-bottom flask (flask volume: 100 mL) to form a cloudy solution, which was evacuated at 150° C. until the cloudy solution became a clear solution, thereby obtaining a solution containing a precursor of Zn (0.5 M), which was kept at a temperature of 80° C.
5. Preparation of a Solution Containing a Precursor of Se Se powder (25 mmol) and TOP (50 mL) were mixed to form a cloudy solution, which was evacuated at 80° C. until the cloudy solution became a clear solution, followed by cooling to room temperature, thereby obtaining a solution containing a precursor of Se (0.5 M).
6. Preparation of a Solution Containing a Precursor of S S powder (50 mmol) and TOP (50 mL) was were mixed to form a cloudy solution, which was evacuated at 80° C. until the cloudy solution became a clear solution, followed by cooling to room temperature, thereby obtaining a solution containing a precursor of S (1.0 M).

Preparation of InP:Zn/ZnSe/ZnS Core-Inner Shell-Outer Shell Semiconductor Quantum Dot Structures The InP:Zn/ZnSe/ZnS core-inner shell-outer shell semiconductor quantum dots structures of EX1 were prepared by consecutive steps (a) to (f) as described below.

In step (a), $In(OAc)_3$ (1 mmol), OA (3.375 mmol) and ODE (20 mL) were mixed in a three-neck round-bottom flask (flask volume: 100 mL) to form a cloudy solution, which was evacuated at 150° C. until the cloudy solution became a clear solution. After the clear solution was cooled to a temperature ranging from 30° C. to 32° C., the three-neck round-bottom flask was filled with nitrogen gas, and then $(TMS)_3P$ (0.5 mmol) and TOP (6.66 mL) were added into the clear solution, thereby obtaining a first mixture solution.

In step (b), the first mixture solution was heated at a heating rate of 20° C./min to and kept at 305° C. for 5 minutes, so as to form seed crystals of InP in the first mixture solution. Each of the seed crystals of InP has a crystal surface having plurality of first regions each of which is inactive with oxygen, and a plurality of second regions each of which is easily reactive with oxygen and is oxidized by oxygen present in the first mixture solution so as to form an oxide layer thereon.

In step (c), the solution containing the precursor of In (0.1 M) in a first syringe pump, the solution containing the precursor of P (0.05 M) in a second syringe pump, and 1.1 mL of the first diluted HF etchant solution (5 vol. %) in a third syringe pump were continuously and simultaneously injected at flow rates of 25 mL/hour, 25 mL/hour and 1.65 mL/hour, respectively, for 40 minutes at 305° C. into the first mixture solution containing the seed crystals of InP obtained after step (b) so as to form the second mixture solution, so as to permit the oxide layer formed on each of the second regions of the seed crystals of InP to be etched by the first diluted HF etchant solution, and so as to grow a plurality of core layers of InP respectively on the seed crystals of InP, thereby obtaining a plurality of preformed cores each including one of the seed crystals of InP and a corresponding one of the core layers of InP in the second mixture solution. To be specific, each of the core layers of InP has a crystal surface having a plurality of first areas and a plurality of second areas; the first areas of each of the core layers of InP are respectively grown on the first regions of a corresponding one of the seed crystals of InP; and the second areas of each of the core layers of InP are respectively grown on the second regions of the corresponding one of the seed crystals of InP. Since the oxide layer formed on each of the second regions of the seed crystals of InP is etched, the probability of the core layers of InP being oxidized is extremely low. In addition, since the first diluted HF etchant solution was injected into the first mixture solution at a low concentration, a low injection volume, and an appropriate injection rate, the risk of danger caused by the release of toxic gases can be greatly reduced.

In step (d), 800 μL of the solution containing the precursor of Zn (0.5 M) was continuously injected for 1 minute into the second mixture solution obtained after step (c) to form a third mixture solution, such that Zn in the solution containing the precursor of Zn reacts with P on the crystal surface of each of the core layers of InP to allow growth of a plurality of barrier layers of $Zn_xP_y$ respectively on the core layers of InP, thereby obtaining a plurality of InP:Zn cores in the third mixture solution.

In step (e), the InP:Zn cores in the third mixture solution were first subjected to a purification treatment. To be specific, 120 mL of toluene and 660 mL of acetone were introduced into 60 mL of the third mixture solution containing the InP:Zn cores obtained after step (d), followed by centrifugation at 4000 rpm for 15 minutes so as to collect the InP:Zn cores, which were then dispersed in 20 mL of toluene. Meanwhile, $Zn(OAc)_2$ (5 mmol), OA (10 mmol) and ODE (20 mL) were mixed in a three-neck round-bottom flask (flask volume: 50 mL) to form a cloudy solution, which was evacuated at 150° C. until the cloudy solution became a clear solution containing a precursor of Zn. Thereafter, the InP:Zn cores dispersed in toluene (5 mL) was injected into the clear solution containing the precursor of Zn at 150° C. under vacuum for 10 minutes so as to evaporate the toluene therefrom, leaving the clear solution containing the precursor of Zn and the InP:Zn cores.

During formation of the semiconductor quantum dots structures of EX1, step (e1) is performed between step (e) and step (f) to be described hereinafter. In step (e1), 60 uL of a second diluted HF etchant solution (10 vol. %) was injected into the clear solution containing the precursor of Zn and the InP:Zn cores so as to etch an oxide layer formed on a surface of each of the barrier layers of $Zn_xP_y$ of the InP:Zn cores and so as to permit surface reorganization of the barrier layers of $Zn_xP_y$.

Step (f) includes sub-steps (f1) and (f2) performed in such order.

In sub-step (f1), the clear solution containing the precursor of Zn and the InP:Zn cores obtained after step (e) was subjected to a heating process, i.e., heated to 320° C. During the heating process, once the clear solution was heated to 260° C., the solution containing the precursor of Se (0.5 M) in a fourth syringe pump was injected into the clear solution containing the precursor of Zn and the InP:Zn cores at an injection rate of 4.3 mL/minute for 80 minutes to form a fourth mixture solution, such that in the fourth mixture solution, Se in the precursor of Se completely reacts with Zn in the precursor of Zn to allow growth of an inner shell layer of ZnSe on each of the barrier layers of $Zn_xP_y$ of the InP:Zn cores.

In sub-step (f2), the solution containing the precursor of S (1.0 M) in a fifth syringe pump was injected into the fourth mixture solution obtained after step (f1) at an injection rate of 2.0 mL/minute for 40 minutes at 320° C. to form a fifth mixture solution, such that in the fifth mixture solution, S in the precursor of S completely reacts with Zn in the precursor of Zn to allow growth of an outer shell layer of ZnS on the inner shell layer of ZnSe, thereby obtaining InP:Zn/ZnSe/ZnS core-inner shell-outer shell semiconductor quantum dot structures of EX1.

Figure 3:
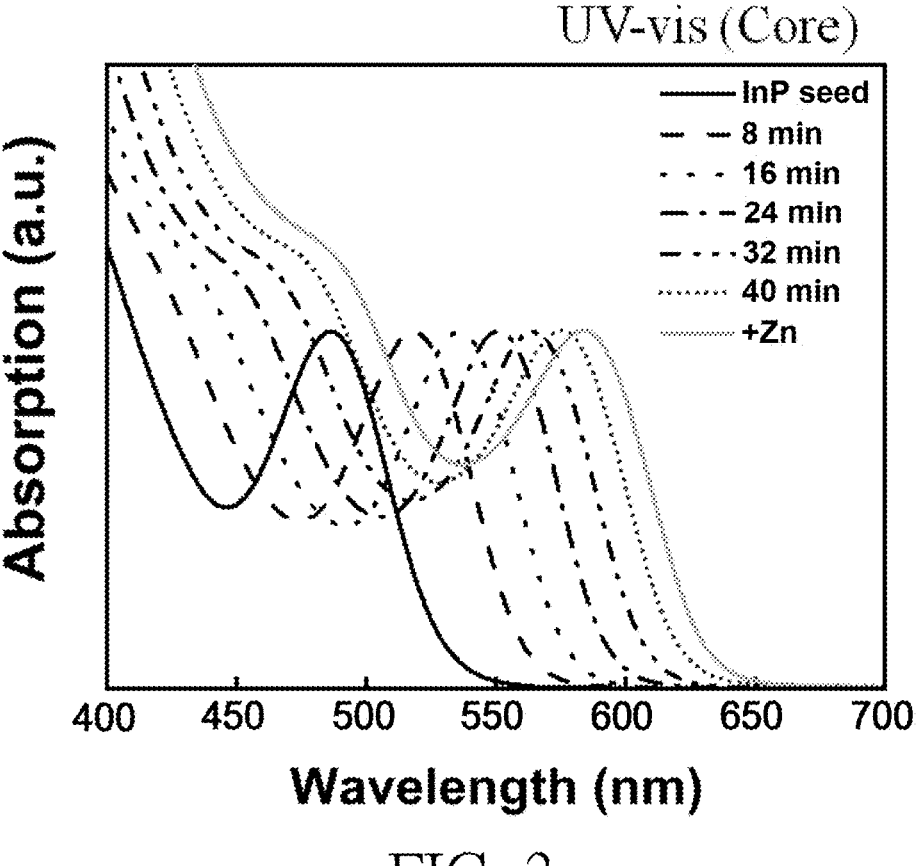
FIG. 3 is an ultraviolet-visible light (UV-vis) absorption spectrum of InP:Zn cores of the semiconductor quantum dot structures of Example 1 (EX1), illustrating wavelengths of absorption peaks of InP seed crystals, InP/InP seed crystals-core layers over increased time period of growth, and InP/InP/Zn$_x$P$_y$ seed crystals-core layers-barrier layers.

Referring to FIG. 3, the ultraviolet-visible light (UV-vis) absorption spectrum of the InP:Zn cores of EX1 shows that during a time period for growing, on the seed crystals of InP, the core layers of InP (i.e., 8 minutes, 16 minutes, 24 minutes, 32 minutes and 40 minutes) and the barrier layers of $Zn_xP_y$ (i.e., +Zn), the absorption peaks thereof shifted to have greater wavelengths of the visible light range, indicating that the core layers of InP are respectively grown on the seed crystals of InP, and the barrier layers of $Zn_xP_y$ are respectively grown on the core layers of InP. It is noted that the particle size distribution of semiconductor quantum dot structures may be determined based on the UV-vis absorption spectrum and the full width at half maximum (FWHM) of emission peak obtained from a photoluminescence spectrum. To be specific, the greater the FWHM value, the broader the particle size distribution; and on the contrary, the smaller the FWHM value, the narrower the particle size distribution (i.e., particle size is more uniform). Based on the UV-vis absorption spectrum shown in FIG. 3, the seed crystals of InP are calculated to have an average particle size of approximately 2.1 nm, the core layers of InP are calculated to have an average thickness of approximately 0.4 nm, and the barrier layers of $Zn_xP_y$ (i.e., +Zn) are calculated to have an average thickness of approximately 0.1 nm, such that the InP:Zn cores of EX1 have an average particle size of approximately 3.1 nm.

Figure 4:
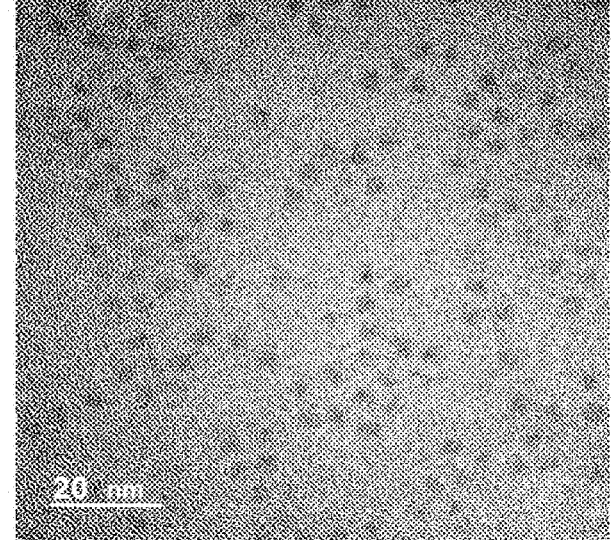
FIG. 4 is a transmission electron microscope (TEM) image illustrating particle size distribution of the InP:Zn cores of the semiconductor quantum dot structures of EX1.

Referring to FIG. 4, the transmission electron microscope (TEM) image indeed shows that the InP:Zn cores of EX1 have an average particle size of approximately 3.1 nm.

Figure 5:
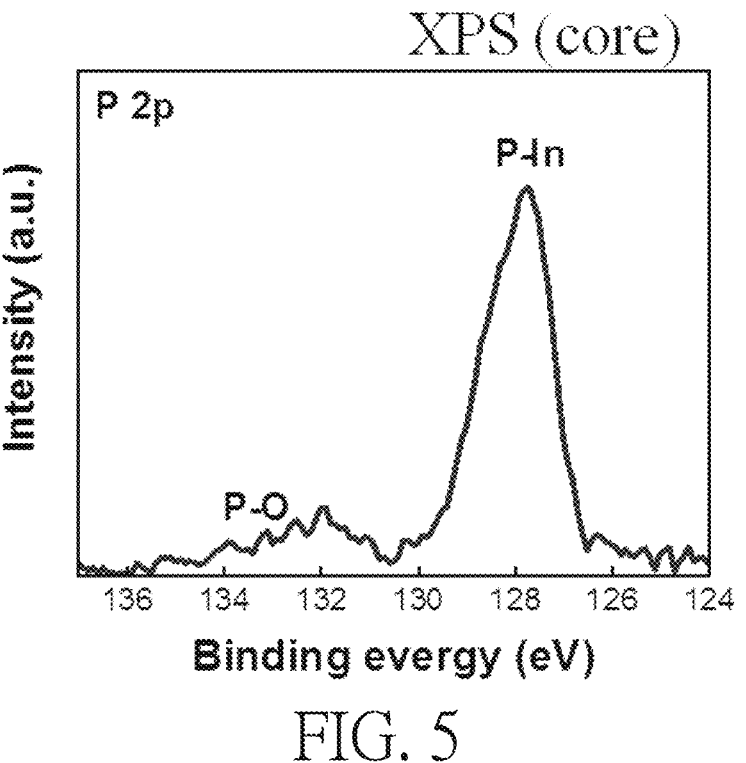
FIG. 5 is an X-ray photoelectron spectrum (XPS) analysis illustrating a P—O peak with weak intensity and a P—In peak with strong intensity in the spectrum of P 2p orbital of the InP:Zn cores of the semiconductor quantum dot structures of EX1.
Figure 6:
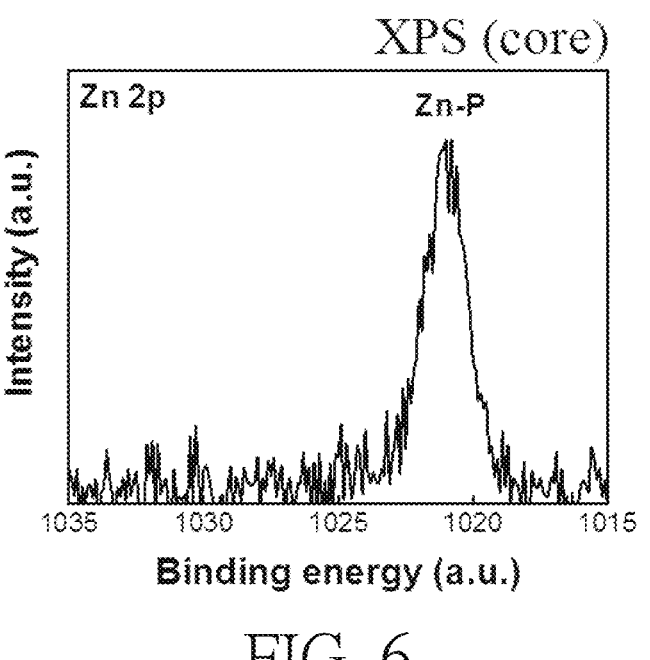
FIG. 6 is an XPS analysis illustrating a Zn—P peak with very strong intensity and absence of Zn—O peak in the spectrum of Zn 2p orbital of the InP:Zn cores of the semiconductor quantum dot structures of EX1.

Referring to FIG. 5, the X-ray photoelectron spectrum (XPS) analysis shows a P—O peak with weak intensity and a P—In peak with strong intensity in the spectrum of P 2p orbital of the InP:Zn cores of the semiconductor quantum dot structures of EX1. On the other hand, referring to FIG. 6, the XPS analysis shows a Zn—P peak with very strong intensity and a total absence of Zn—O peak in the spectrum of Zn 2p orbital of the InP:Zn cores of the semiconductor quantum dot structures of EX1. These results indicate that in step (c), when the solution containing the precursor of In (0.1 M) in the first syringe pump, the solution containing the precursor of P (0.05 M) in the second syringe pump, and 1.1 mL of the first diluted HF etchant solution (5 vol. %) in the third syringe pump were continuously and simultaneously injected into the first mixture solution obtained after step (b), the oxide layer formed on each of the second regions 212 of the seed crystals 21 which is easily reactive with oxygen is etched by the first diluted HF etchant solution while the core layers 22 of InP are simultaneously grown on the seed crystals 21, respectively. In addition, other oxide layer formed on the surface of each of the core layers of InP which is easily reactive with oxygen can also be etched by the first diluted HF etchant solution as the thicknesses of the core layers 22 of InP increase. Thus, signals representing oxidation peaks in the XPS analysis are very weak. As such, in the photoluminescence spectrum of the InP:Zn/ZnSe/ZnS core-inner shell-outer shell semiconductor quantum dot structures of EX1, the FWHM of emission peak is expected to be narrow.

Figure 7:
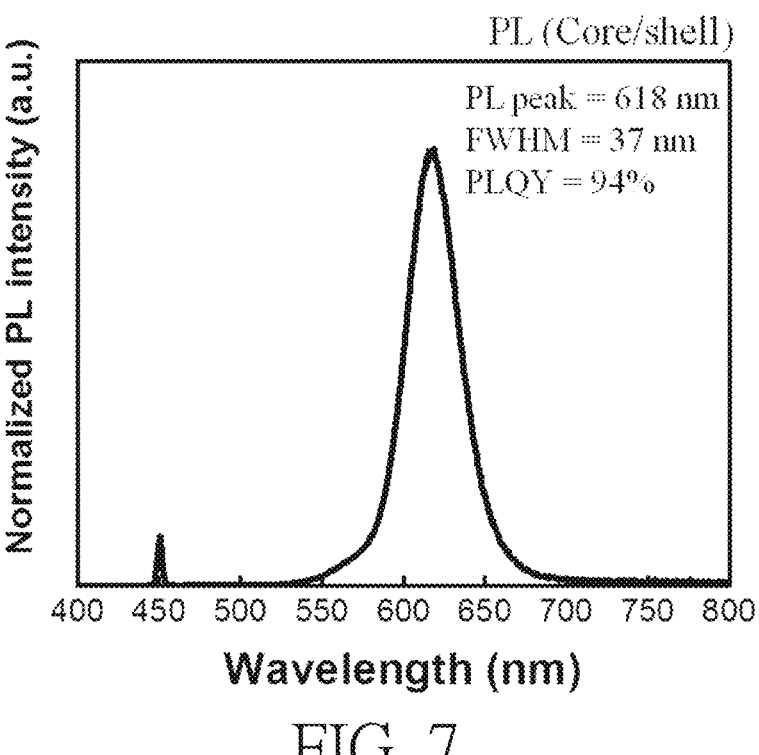
FIG. 7 is a photoluminescence spectrum illustrating emission peak wavelength, full width at half maximum (FWHM) value, and quantum yield of the InP:Zn/ZnSe/ZnS core-inner shell-outer shell semiconductor quantum dot structures of EX1.

Referring to the photoluminescence spectrum shown in FIG. 7, the InP:Zn/ZnSe/ZnS core-inner shell-outer shell semiconductor quantum dot structures of EX1 have an emission peak wavelength of 618 nm, an FWHM of emission peak of only 37 nm, and a quantum yield of 94%, confirming that the particle size distribution of the semiconductor quantum dot structures of EX1 is narrow, and that the visible light absorbed by the InP:Zn cores is effectively emitted, thereby contributing to the high quantum yield.

Example 2 (EX2)

Preparation of InP:Zn/ZnSeS$_{gradient}$/ZnS Core-Inner Shell-Outer Shell Semiconductor Quantum Dot Structures The InP:Zn/ZnSeS$_{gradient}$/ZnS core-inner shell-outer shell semiconductor quantum dot structures of EX2 were prepared using procedures similar to those of InP:Zn/ZnSe/ZnS core-inner shell-outer shell semiconductor quantum dot structures of EX1, except that in step (f1) of EX2, a solution containing a precursor of Se and a precursor of S was used.

The solution containing the precursor of Se and the precursor of S (0.5 M) was prepared by mixing Se powder (25 mmol), S powder (12.5 mmol) and TOP (50 mL) to form a cloudy solution, which was evacuated at 80° C. until the cloudy solution became a clear solution, followed by cooling to room temperature.

In step (f1), the solution containing the precursor of Se and the precursor of S (0.5 M) in the fourth syringe pump was injected into the clear solution containing the precursor of Zn and the InP:Zn cores obtained after step (e) to form the fourth mixture solution, in which the molar ratio of Se to S is 2:1, such that in the fourth mixture solution, Se in the precursor of Se and S in the precursor of S completely react with Zn in the precursor of Zn to allow growth of the inner shell layer of ZnSeS on each of the barrier layers of Zn$_x$P$_y$ of the InP:Zn cores. To be specific, based on the reactivity of the Se in the precursor of Se and S in the precursor of S, and the molar ratio of Se to S being 2:1 in the fourth mixture solution, the amount of Se distributed in the inner shell layer of ZnSeS on each of the barrier layers of Zn$_x$P$_y$ gradually decreases in a direction away from a corresponding one of the seed crystals of InP, whereas the amount of S distributed in the inner shell layer of ZnSeS on each of the barrier layers of Zn$_x$P$_y$ gradually increases in the direction away from the corresponding one of the seed crystals of InP.

Figure 8:
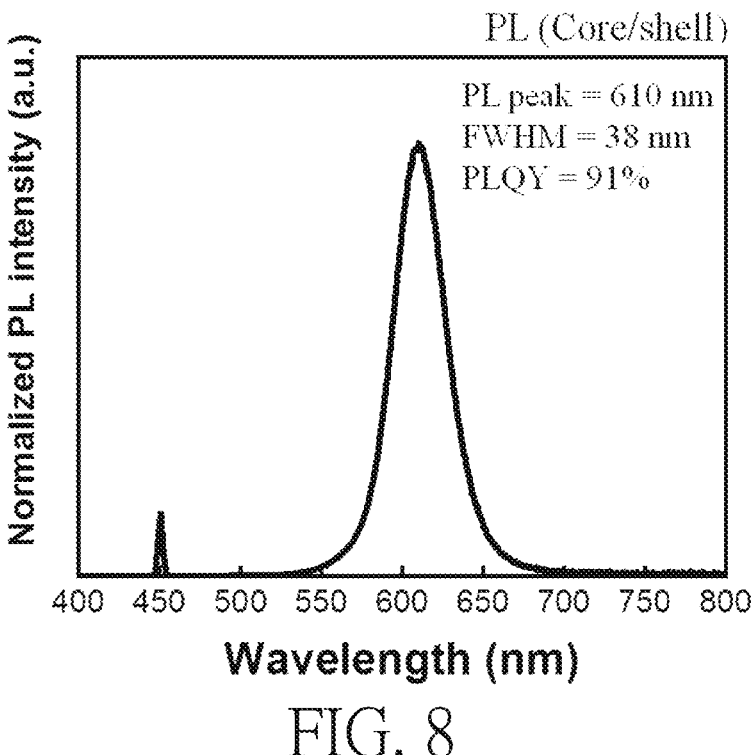
FIG. 8 is a photoluminescence spectrum illustrating emission peak wavelength, FWHM value, and quantum yield of the InP:Zn/ZnSeS$_{gradient}$/ZnS core-inner shell-outer shell semiconductor quantum dot structures of Example 2 (EX2).

Referring to the photoluminescence spectrum shown in FIG. 8, the InP:Zn/ZnSeS$_{gradient}$/ZnS core-inner shell-outer shell semiconductor quantum dot structures of EX2 have an emission peak wavelength of 610 nm, an FWHM of emission peak of only 38 nm, and a quantum yield of 91%, confirming that the particle size distribution of the semiconductor quantum dot structures of EX2 is narrow, and that the visible light absorbed by the InP:Zn cores is effectively emitted, thereby contributing to the high quantum yield.

Example 3 (EX3)

Preparation of InP:Zn/ZnSeS$_{alloyed}$/ZnS Core-Inner Shell-Outer Shell Semiconductor Quantum Dot Structures The InP:Zn/ZnSeS$_{alloyed}$/ZnS core-inner shell-outer shell semiconductor quantum dot structures of EX3 were prepared using procedures similar to those of InP:Zn/ZnSeS$_{gradient}$/ZnS core-inner shell-outer shell semiconductor quantum dot structures of EX2, except that in step (f1) of EX3, another solution containing a precursor of Se and a precursor of S was used.

The another solution containing the precursor of Se and the precursor of S (0.5 M) was prepared by mixing Se powder (25 mmol), S powder (25 mmol) and TOP (50 mL) to form a cloudy solution, which was evacuated at 80° C. until the cloudy solution became a clear solution, followed by cooling to room temperature.

To be specific, in step (f1), based on the reactivity of the Se in the precursor of Se and S in the precursor of S, and the molar ratio of Se to S being 1:1 in the fourth mixture solution, the reaction energies of the Se in the precursor of Se and Zn in the precursor of Zn compete with those of the S in the precursor of S and Zn in the precursor of Zn, such that the inner shell layer of ZnSeS is grown on each of the barrier layers of Zn$_x$P$_y$ of the InP:Zn cores, and Se and S are evenly distributed to form an alloy with Zn in the inner shell layer of ZnSeS. That is to say, the amount ratio of Se and S in the inner shell layer of ZnSeS formed on each of the barrier layers of Zn$_x$P$_y$ does not change in the direction away from the corresponding one of the seed crystals of InP.

Figure 9:
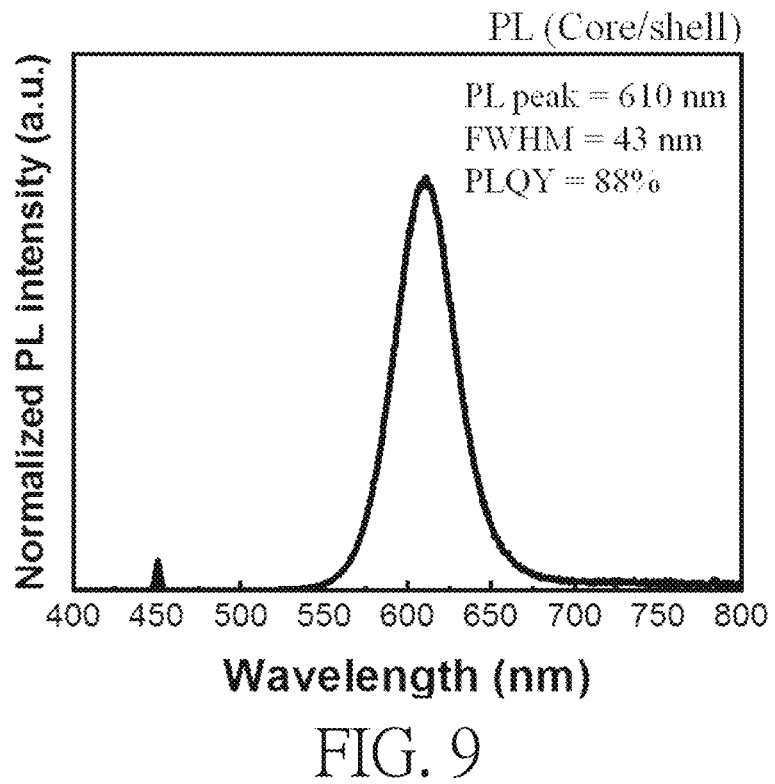
FIG. 9 is a photoluminescence spectrum illustrating emission peak wavelength, FWHM value, and quantum yield of the InP:Zn/ZnSeS$_{alloyed}$/ZnS core-inner shell-outer shell semiconductor quantum dot structures of Example 3 (EX3).

Referring to the photoluminescence spectrum shown in FIG. 9, the InP:Zn/ZnSeS$_{alloyed}$/ZnS core-inner shell-outer shell semiconductor quantum dot structures of EX3 have an emission peak wavelength of 610 nm, an FWHM of emission peak of approximately 43 nm, and a quantum yield of 88%, confirming that the particle size distribution of the semiconductor quantum dot structures of EX3 is narrow, and that the visible light absorbed by the InP:Zn cores is effectively emitted, thereby contributing to the high quantum yield.

Example 4 (EX4)

Preparation of InP:Cd/ZnSe/ZnS Core-Inner Shell-Outer Shell Semiconductor Quantum Dot Structures The InP:Cd/ZnSe/ZnS core-inner shell-outer shell semiconductor quantum dot structures of EX4 were prepared using procedures similar to those of InP:Zn/ZnSe/ZnS core-inner shell-outer shell semiconductor quantum dot structures of EX1, except that in step (d) of EX4, a solution containing a precursor of Cd was used.

The solution containing the precursor of Cd (0.1 M) was prepared by mixing CdO (10 mmol), OA (40 mmol) and ODE (84 mL) in a three-neck round-bottom flask (flask volume: 250 mL) to form a cloudy solution, which was evacuated at 150° C. until the cloudy solution became a clear solution, followed by keeping the clear solution at 80° C. for use in step (d).

In step (d), 4 mL of the solution containing the precursor of Cd (0.1 M) was continuously injected for 1 minute into the second mixture solution obtained after step (c) to form a third mixture solution, such that Cd in the solution containing the precursor of Cd reacts with P on the crystal surface of each of the core layers of InP to allow growth of a plurality of barrier layers of Cd$_x$P$_y$ respectively on the core layers of InP, thereby obtaining a plurality of InP:Cd cores in the third mixture solution.

Figure 10:
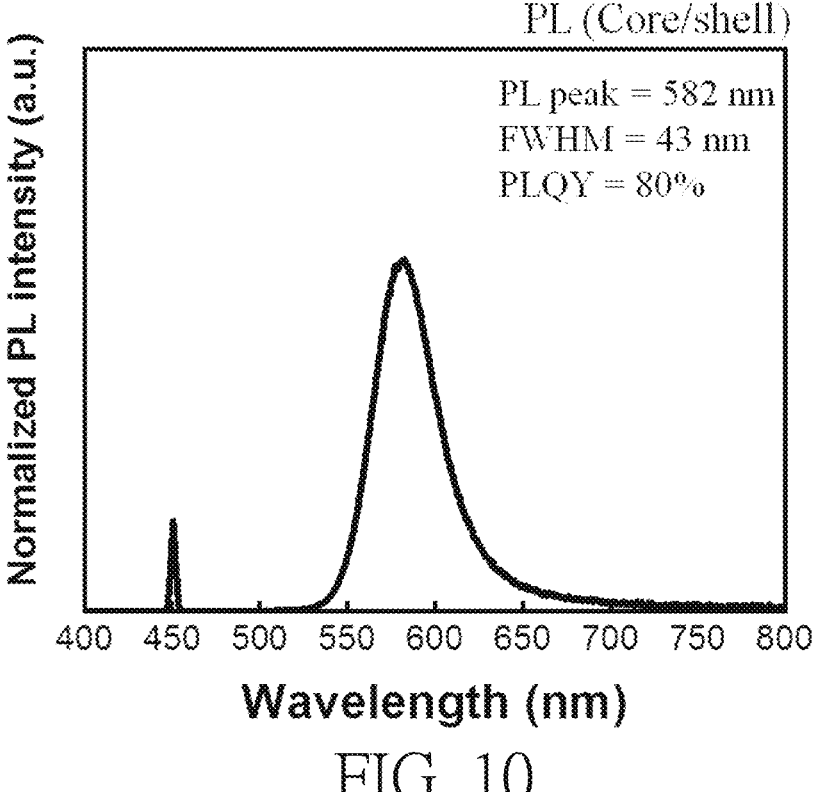
FIG. 10 is a photoluminescence spectrum illustrating emission peak wavelength, FWHM value, and quantum yield of the InP:Cd/ZnSe/ZnS core-inner shell-outer shell semiconductor quantum dot structures of Example 4 (EX4).

Referring to the photoluminescence spectrum shown in FIG. 10, the InP:Cd/ZnSe/ZnS core-inner shell-outer shell semiconductor quantum dot structures of EX4 have an emission peak wavelength of 582 nm, an FWHM of emission peak of approximately 43 nm, and a quantum yield of 80%, confirming that the particle size distribution of the semiconductor quantum dot structures of EX4 is narrow, and that the visible light absorbed by the InP:Cd cores is effectively emitted, thereby contributing to the high quantum yield.

Example 5 (EX5)

Preparation of InP:Se/ZnSe/ZnS Core-Inner Shell-Outer Shell Semiconductor Quantum Dot Structures The InP:Se/ZnSe/ZnS core-inner shell-outer shell semiconductor quantum dot structures of EX5 were prepared using procedures similar to those of InP:Zn/ZnSe/ZnS core-inner shell-outer shell semiconductor quantum dot structures of EX1, except that in EX5, steps (d) and (e), and sub-steps (f1) and (f2) of step (f) were conducted in a different manner.

In step (d), the solution containing the precursor of Se (0.5 M) for growing the inner shell layer of ZnSe as described in EX1 was used. To be specific, 800 μL of the solution containing the precursor of Se (0.5 M) was continuously injected for 1 minute into the second mixture solution obtained after step (c) to form a third mixture solution, such that Se in the solution containing the precursor of Se reacts with In on the crystal surface of each of the core layers of InP to allow growth of a plurality of barrier layers of $In_xSe_y$, respectively on the core layers of InP, thereby obtaining a plurality of InP:Se cores in the third mixture solution.

In step (e), $Zn(OAc)_2$ (17 mmol), OA (34 mmol) and ODE (50 mL) were mixed in a three-neck round-bottom flask (flask volume: 100 mL) to form a cloudy solution, which was evacuated at 150° C. until the cloudy solution became the clear solution containing a precursor of Zn.

In step (f1), during the heating process for heating the clear solution containing the precursor of Zn and the InP:Se cores obtained after step (e1) to 320° C., once the clear solution was heated to 260° C., the solution containing the precursor of Se (0.5 M) in the fourth syringe pump was injected into the clear solution containing the precursor of Zn and the InP:Se cores at an injection rate of 4.3 mL/minute for 240 minutes to form a fourth mixture solution, such that in the fourth mixture solution, Se in the precursor of Se completely reacts with Zn in the precursor of Zn to allow growth of the inner shell layer of ZnSe on each of the barrier layers of $In_xSe_y$ of the InP:Se cores.

In step (f2), the solution containing the precursor of S (1.0 M) in the fifth syringe pump was injected into the fourth mixture solution obtained after step (f1) at an injection rate of 2.0 mL/minute for 240 minutes at 320° C. to form a fifth mixture solution, such that in the fifth mixture solution, S in the precursor of S completely reacts with Zn in the precursor of Zn to allow growth of the outer shell layer of ZnS on the inner shell layer of ZnSe, thereby obtaining InP:Se/ZnSe/ZnS core-inner shell-outer shell semiconductor quantum dot structures of EX5.

Figure 11:
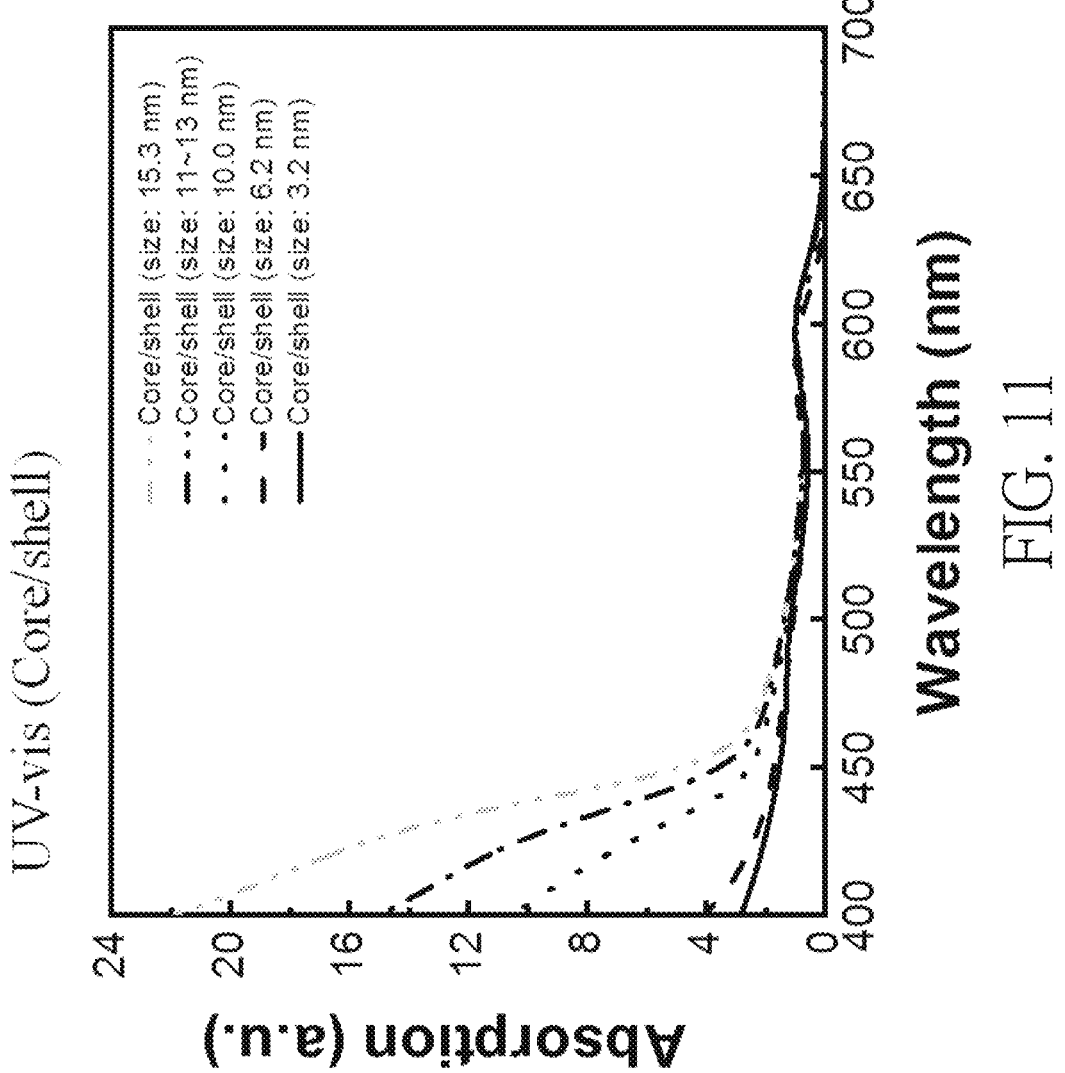
FIG. 11 is an UV-vis absorption spectrum illustrating wavelengths of absorption peaks of the InP:Se/ZnSe/ZnS core-inner shell-outer shell semiconductor quantum dot structures of Example 5 (EX5) which have different particle sizes.

Referring to FIG. 11, the UV-vis absorption spectrum of the InP:Se/ZnSe/ZnS core-inner shell-outer shell semiconductor quantum dot structures of EX5 shows that, during a time period for growing the inner shell layer of ZnSe and the outer shell layer of ZnS on each of the InP:Se cores, the intensity of absorption peaks thereof significantly increased, preliminarily confirming that increase in the thickness of the shell including the inner shell layer of ZnSe and the outer shell layer of ZnS is advantageous for improving absorption of the semiconductor quantum dot structures in the visible light range.

Figure 14:
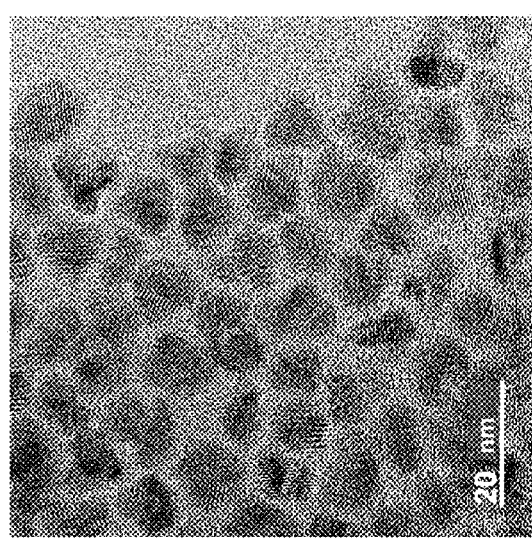
FIG. 14 is yet another TEM image illustrating the InP:Se/ZnSe/ZnS core-inner shell-outer shell semiconductor quantum dot structures of EX5 which have an average particle size of 15.3 nm.
Figure 13:
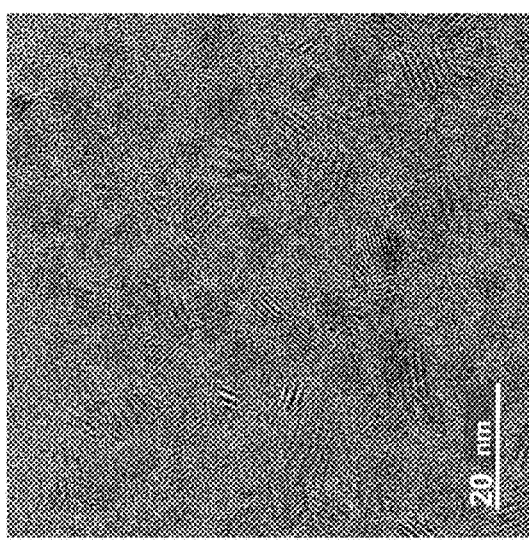
FIG. 13 is another TEM image illustrating the InP:Se/ZnSe/ZnS core-inner shell-outer shell semiconductor quantum dot structures of EX5 which have an average particle size of 10.0 nm.
Figure 12:
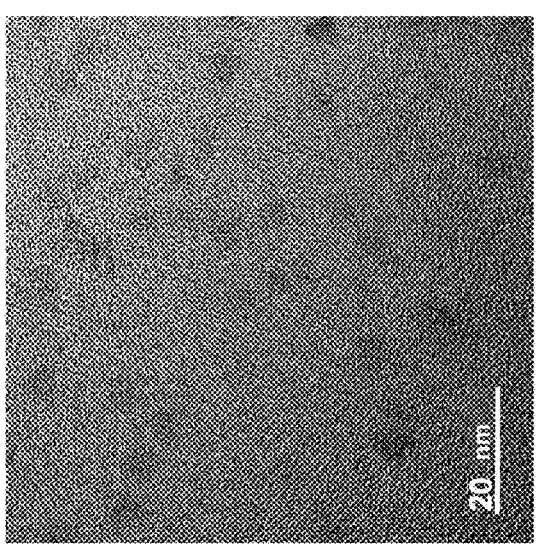
FIG. 12 is a TEM image illustrating the InP:Se/ZnSe/ZnS core-inner shell-outer shell semiconductor quantum dot structures of EX5 which have an average particle size of 6.2 nm.

Referring to FIGS. 12 to 14, the TEM images respectively show that the InP:Se/ZnSe/ZnS core-inner shell-outer shell semiconductor quantum dot structures of EX5 have an average particle size of approximately 6.2 nm when the time period for growing the shell was approximately 60 minutes (see FIG. 12), an average particle size of approximately 10.0 nm when the time period for growing the shell was approximately 120 minutes (see FIG. 13), and an average particle size of approximately 15.3 nm when the time period for growing the shell was approximately 480 minutes (see FIG. 14).

Figure 15:
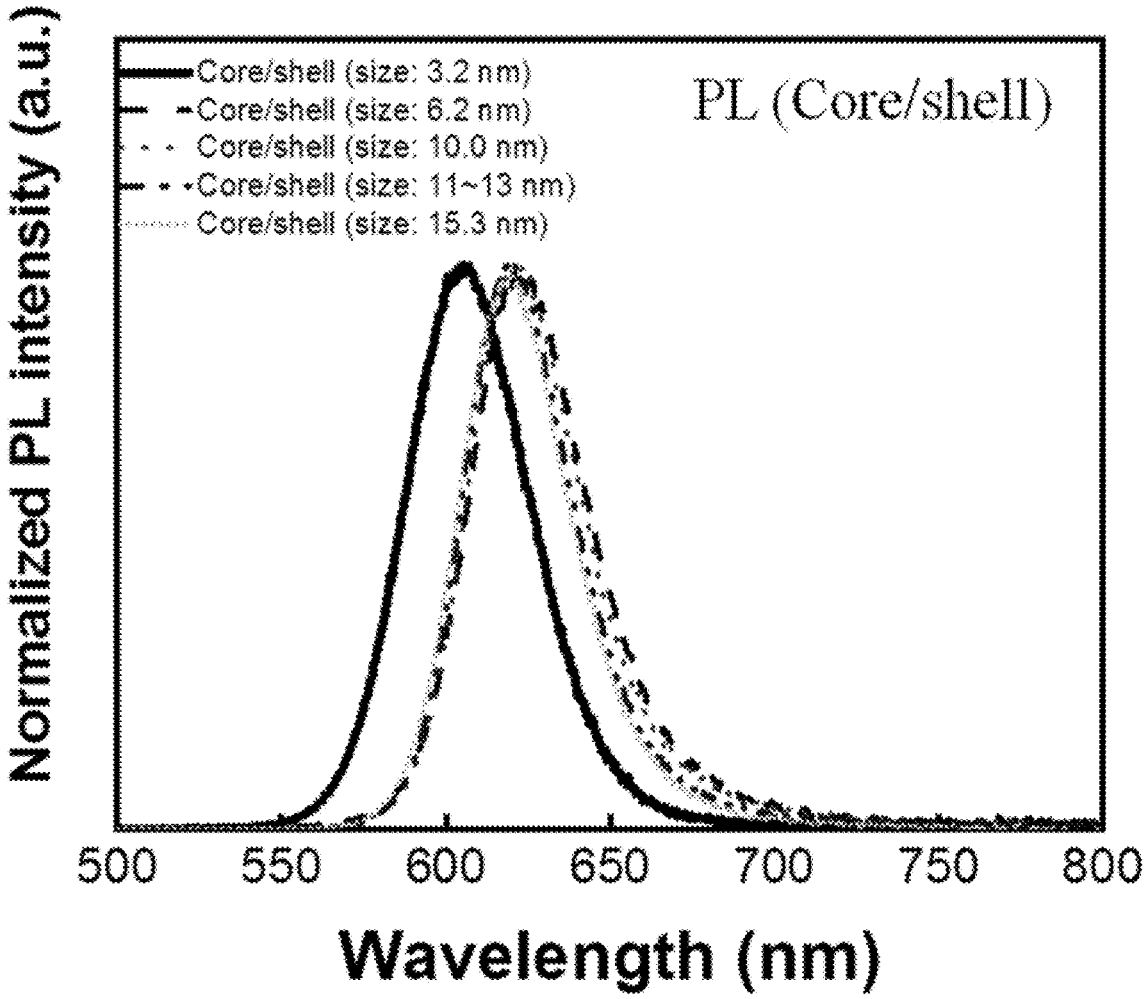
FIG. 15 is a photoluminescence spectrum illustrating wavelengths of emission peaks of the InP:Se/ZnSe/ZnS core-inner shell-outer shell semiconductor quantum dot structures of EX5 which have different particle sizes.

Referring to the photoluminescence spectrum shown in FIG. 15, and results of data analysis obtained therefrom as shown in Table 1 below, the InP:Se/ZnSe/ZnS core-inner shell-outer shell semiconductor quantum dot structures of EX5 have an emission peak wavelength of 605 nm when the average particle size thereof is 3.2 nm, and an emission peak wavelength ranging from 619 nm to 622 nm when the average particle size thereof ranges from 6.2 nm to 15.3 nm. In addition, when the InP:Se/ZnSe/ZnS core-inner shell-outer shell semiconductor quantum dot structures of EX5 have an average particle size ranging from 6.2 nm to 15.3 nm, the FWHM of emission peak thereof merely ranges from 38.2 nm to 41.3 nm, indicating that the particle size distribution thereof is narrow, and the quantum yield thereof ranges from 94% to 99% (see Table 1). Therefore, the semiconductor quantum dot structures of EX5 have a good stability.

TABLE 1

| Average particle size of semiconductor quantum dot structures (nm) of EX5 | Quantum yield (%) | Emission peak wavelength (nm) | FWHM of emission peak (nm) |
|---|---|---|---|
| 3.2 | 81 | 605 | 44.1 |
| 6.2 | 94 | 622 | 41.3 |
| 10.0 | 99 | 621 | 40.4 |
| 11.0 to 13.0 | 98 | 620 | 38.6 |
| 15.3 | 94 | 619 | 38.2 |

Example 6 (EX6)

Preparation of InP:Se/ZnSe/ZnS Core-Inner Shell-Outer Shell Semiconductor Quantum Dot Structures The InP:Se/ZnSe/ZnS core-inner shell-outer shell semiconductor quantum dot structures of EX6 were prepared using procedures similar to those of InP:Se/ZnSe/ZnS core-inner shell-outer shell semiconductor quantum dot structures of EX5, except that in EX6, step (e1) was not conducted.

Figure 16:
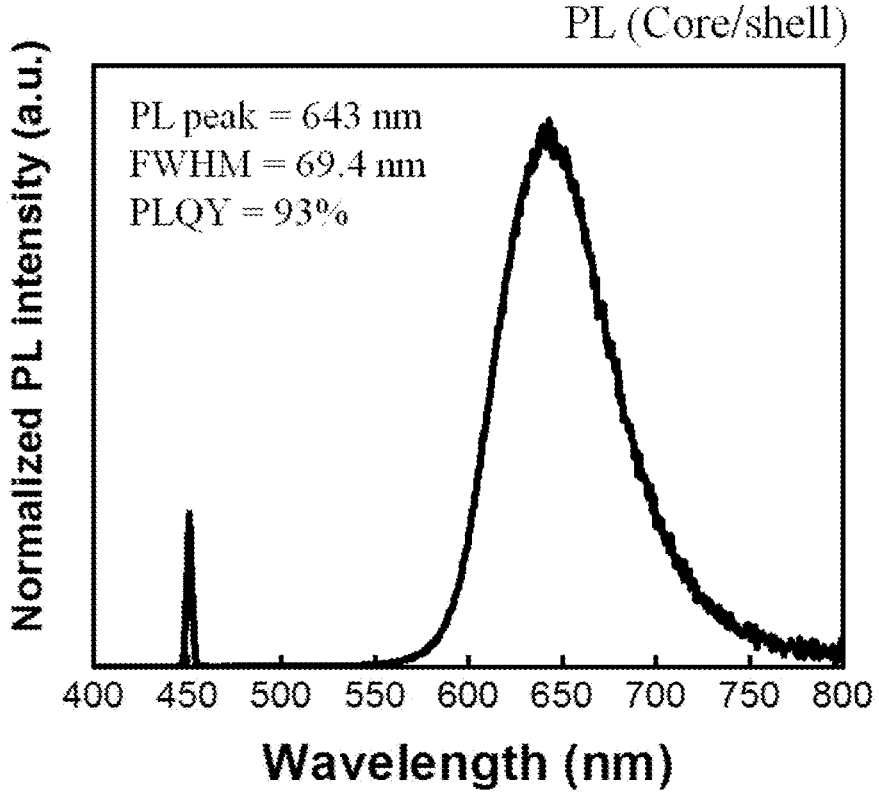
FIG. 16 is a photoluminescence spectrum illustrating emission peak wavelength, FWHM value, and quantum yield of the InP:Se/ZnSe/ZnS core-inner shell-outer shell semiconductor quantum dot structures of Example 6 (EX6).

Referring to FIG. 16, the photoluminescence spectrum of the InP:Se/ZnSe/ZnS core-inner shell-outer shell semiconductor quantum dot structures of EX6 has an emission peak wavelength of 643 nm, an FWHM of emission peak of 69.4 nm, and a quantum yield of 93%. In EX6, although 60 uL of the second diluted HF etchant solution (10 vol. %) was not added into the clear solution containing the precursor of Zn and the InP:Se cores in step (e1) before growth of the inner shell layer of ZnSe on each of the barrier layers of $In_xSe_y$ of the InP:Se cores in sub-step (f1), causing the FWHM of emission peak thereof to increase to 69.4 nm, which is relatively greater than that of EX5; however, the quantum yield thereof is still high. In consideration that the FWHM of emission peak is not required to be narrow, the quantum yield of the InP:Se/ZnSe/ZnS core-inner shell-outer shell semiconductor quantum dot structures of EX6 is still high with a value of 93%, indicating that the semiconductor quantum dot structures of EX6 have a relatively excellent quality.

Comparative Example 1 (CE1)

In order to compare the properties and efficiency of the aforesaid semiconductor quantum dot structures of EX1 to EX6, semiconductor quantum dot structures of CE1 were prepared according to an article by Ramasamy et al. entitled "Two-Step 'Seed Mediated' Synthetic Approach to Colloidal Indium Phosphide Quantum Dots with High-Purity Photo- and Electroluminescence" in Chem. Mater., 2018, Vol. 30, p.

3643-3647. The semiconductor quantum dot structures of CE1 have a basic structural configuration of InP seed crystal/In(Zn)P(complex) core layer/ZnSe first inner shell layer/ZnSe second inner shell layer/ZnS outer shell layer.

Preparation of Precursor Solutions

1. Preparation of a Solution Containing a Precursor of In, a Precursor of Zn and a Precursor of P In(OAc)₃ (1 mmol), Zn(OAc)₂ (0.5 mmol), and OA (4 mmol) were mixed with 10 mL of ODE in a three-neck round-bottom flask (flask volume: 50 mL) to form a cloudy solution, which was evacuated at 150° C. until the cloudy solution became a clear solution, followed by cooling to room temperature. Then, (TMS)₃P (0.66 mmol) and 1 mL of TOP were added into the clear solution, followed by stirring for 3 hours, thereby obtaining a solution containing a precursor of In, a precursor of Zn and a precursor of P.

2. Preparation of a Solution Containing a Precursor of Zn

Zn(SA)₂ (4 mmol) and 10 mL of TOP were mixed and then heated at 150° C. for 1 hour, so as to obtain a solution containing a precursor of Zn.

3. Preparation of a Solution Containing a Precursor of Se

Se powder (1.2 mmol) and 1.2 mL of TOP were mixed and then heated at 130° C. for 1 hour, so as to obtain a solution containing a precursor of Se.

4. Preparation of a Solution Containing a Precursor of S

S powder (0.5 mmol) and 0.5 mL of TOP were mixed and then heated at 130° C. for 1 hour, so as to obtain a solution containing a precursor of S.

Preparation of InP—In(Zn)P/(ZnSe/ZnSe)/ZnS Core-First Inner Shell-Second Inner Shell-Outer Shell Semiconductor Quantum Dot Structures First, In(OAc)₃ (0.15 mmol), OA (0.47 mmol) and ODE (10 mL) were mixed in a three-neck round-bottom flask (flask volume: 50 mL) to form a cloudy solution, which was evacuated at 150° C. until the cloudy solution became a clear solution, followed by cooling the clear solution to a temperature ranging from 30° C. to 32° C. Next, (TMS)₃P (0.1 mmol) and TOP (1.0 mL) were added into the clear solution to form a first mixture solution, followed by heating at a heating rate of 15° C./min to 300° C. for 2 minutes, and then cooling to room temperature, so as to form seed crystals of InP in the first mixture solution.

Thereafter, the first mixture solution containing the seed crystals of InP (5 mL) was mixed with 10 mL of ODE in another three-neck round-bottom flask (flask volume: 50 mL) to form a second mixture solution, followed by heating at a heating rate of 15° C./min to 300° C., and while keeping the second mixture solution at 300° C., 3.3 mL of the solution containing the precursor of In, the precursor of Zn and the precursor of P was injected at a flow rate of 1.1 mL/hour into the second mixture solution containing the seed crystals of InP to form the third mixture solution, such that in the third mixture solution, a plurality of core layers of InP(Zn)P(complex) are respectively grown on the seed crystals of InP, thereby obtaining a plurality of cores each including one of the seed crystals of InP and a corresponding one of the core layers of InP(Zn)P(complex).

Afterwards, 1.0 mL of the solution containing the precursor of Zn was added into the third mixture solution containing the cores at 300° C. and then kept at 300° C. for 10 minutes, followed by adding 0.4 mL of the solution containing the precursor of Se at 300° C. and then kept at 300° C. for 15 minutes to form a fourth mixture solution, such that the first inner shell layer of ZnSe is grown on each of the core layers of InP(Zn)P(complex) of the cores in the fourth mixture solution. Subsequently, 2.0 mL of the solution containing the precursor of Zn was added into the fourth mixture solution at 300° C. and then kept at 300° C. for 10 minutes, followed by adding 0.8 mL of the solution containing the precursor of Se at 300° C. and then kept at 300° C. for 15 minutes to form a fifth mixture solution, so as to allow growth of the second inner shell layer of ZnSe on the first inner shell layer of ZnSe on each of the cores in the fifth mixture solution. Thereafter, 2.5 mL of the solution containing the precursor of Zn was added into the fifth mixture solution at 300° C. and then kept at 300° C. for 10 minutes, and then 0.5 mL of the solution containing the precursor of S was added at 300° C. and then kept at 300° C. for 15 minutes to form a sixth mixture solution, so as to allow growth of the outer shell layer of ZnS on the second inner shell layer of ZnSe in the sixth mixture solution, followed by cooling to room temperature and a purification treatment, thereby obtaining the InP—In(Zn)P/(ZnSe/ZnSe)/ZnS core-first inner shell-second inner shell-outer shell semiconductor quantum dot structures of CE1.

Figure 17:
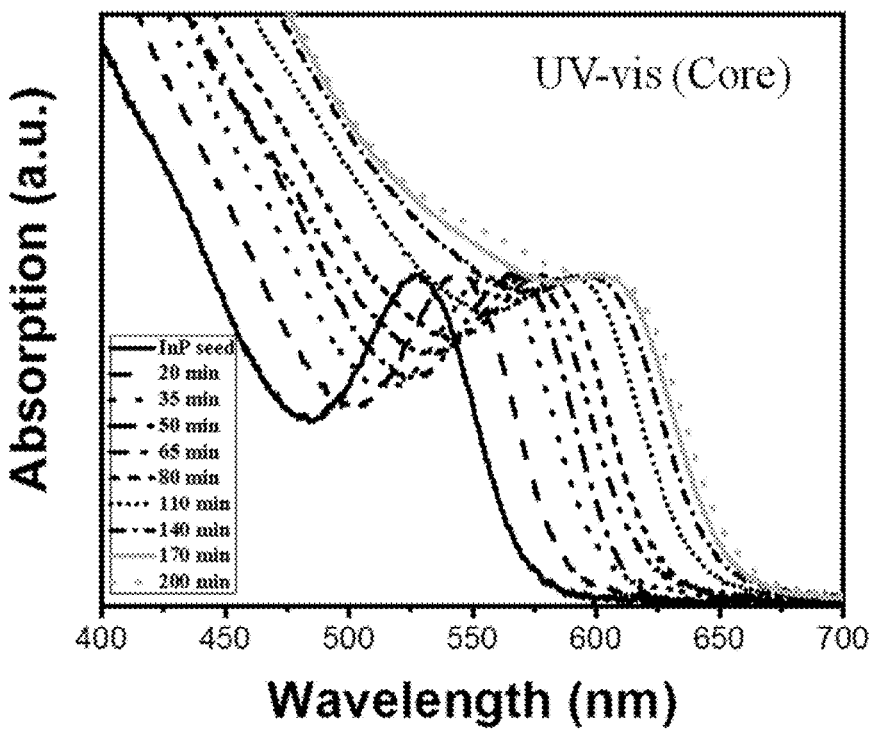
FIG. 17 is an UV-vis absorption spectrum of the InP—In(Zn)P(complex) cores of the semiconductor quantum dot structures of Comparative Example 1 (CE1), illustrating wavelengths of absorption peaks of the InP seed crystal and the InP/In(Zn)P seed crystal-(complex) core layer over increased time period of growth.
Figure 18:
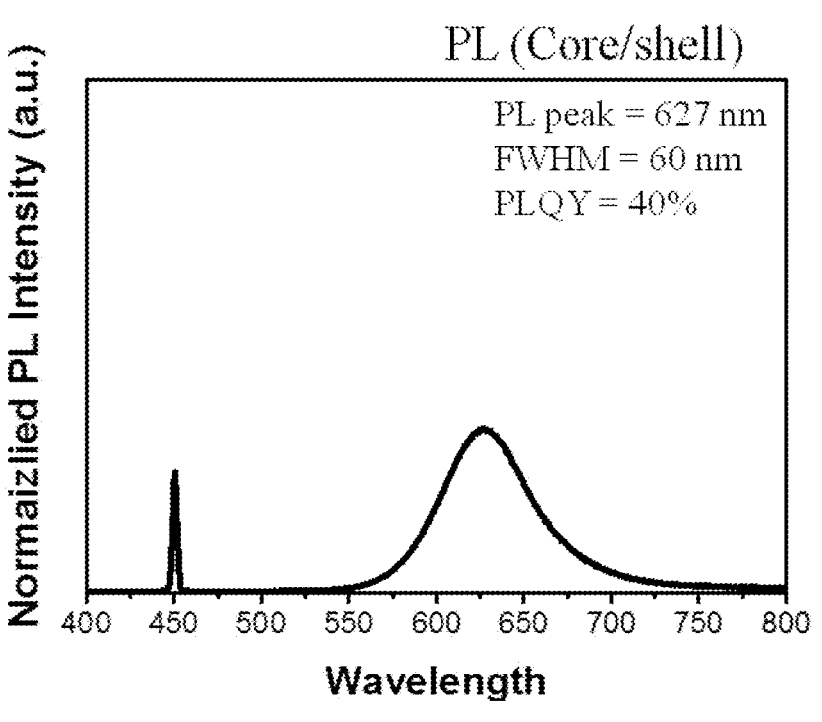
FIG. 18 is a photoluminescence spectrum illustrating emission peak wavelength, FWHM value, and quantum yield of the InP—In(Zn)P/(ZnSe/ZnSe)/ZnS core-first inner shell-second inner shell-outer shell semiconductor quantum dot structures of CE1.

Referring to FIG. 17, the UV-vis absorption spectrum of the InP—In(Zn)P(complex) cores of CE1 shows that during a time period for growing the core layers of In(Zn)P(complex) respectively on the seed crystals of InP, the absorption peaks thereof shifted to have greater wavelengths of the visible light range. However, referring to the photoluminescence spectrum shown in FIG. 18, the quantum yield of the InP—In(Zn)P/(ZnSe/ZnSe)/ZnS core-first inner shell-second inner shell-outer shell semiconductor quantum dot structures of CE1 is only 40% despite having an emission peak wavelength of 627 nm and an FWHM of emission peak of approximately 60 nm. The reasons the semiconductor quantum dot structures of CE1 have a relatively low quantum yield are due to: (i) the seed crystals of InP were not subjected to an etching treatment using the diluted fluoride-containing etchant, causing the core layers of In(Zn)P(complex) to be poorly grown on the seed crystals of InP due to the presence of oxide layers on the crystal surfaces of the seed crystals of InP; and (ii) oxide layers might be formed on the core layers of In(Zn)P(complex) due to the presence of oxygen residues in the solution containing the precursor of In, the precursor of Zn and the precursor of P. To be specific, since the core layers of In(Zn)P(complex) were poorly grown on the seed crystals of InP, during the growth of the first inner shell layers of ZnSe respectively on the core layers of In(Zn)P(complex) at a high temperature, the diffusion of In and P elements from the seed crystals of InP into the first inner shell layers of ZnSe and the diffusion of Zn and Se elements from the first inner shell layers of ZnSe into the seed crystals of InP would not be suppressed, allowing such elements to form alloys and causing the electron-hole pairs not being effectively confined in the InP—In(Zn)P (complex) cores, resulting in destruction of an ideal structure of the shell, thereby contributing to low quantum yield of the semiconductor quantum dot structures of CE1. In comparison with the InP:Se/ZnSe/ZnS core-inner shell-outer shell semiconductor quantum dot structures of EX6 which has a relatively high quantum yield, even in consideration that the FWHM of emission peak is not required to be narrow, the quality of the InP—In(Zn)P/(ZnSe/ZnSe)/ZnS core-first inner shell-second inner shell-outer shell semiconductor quantum dot structures of CE1 is inferior because the quantum yield thereof is only 40%.

Comparative Example 2 (CE2)

In order to compare the properties and efficiency of the aforesaid semiconductor quantum dot structures of EX1 to EX6, semiconductor quantum dot structures of CE2 were prepared according to the method disclosed in Taiwanese Invention Patent No. TW I741954 B. The semiconductor quantum dot structures of CE2 have a basic structural configuration of InP seed crystal/InP core layer/ZnSe inner shell layer/ZnSe first outer shell layer/ZnS second outer shell layer.

Preparation of Precursor Solutions

1. Preparation of a Solution Containing a Precursor of in and a Precursor of P

In(OAc)$_3$ (2 mmol) and OA (6 mmol) were mixed with 10 mL of ODE in a three-neck round-bottom flask (flask volume: 50 mL) to form a cloudy solution, which was evacuated at 150° C. until the cloudy solution became a clear solution, followed by cooling to a temperature ranging from 30° C. to 32° C. Thereafter, the three-neck round-bottom flask was filled with nitrogen gas, and then (TMS)$_3$P (1 mmol) and 1 mL of TOP were added into the clear solution, followed by stirring for 20 minutes, thereby obtaining a solution containing a precursor of In and a precursor of P.

2. Preparation of a Solution Containing a Precursor of Zn

Zn(OAc)$_2$ (5 mmol) and OA (10 mmol) were mixed with 6.8 mL of ODE in a three-neck round-bottom flask (flask volume: 50 mL) to form a cloudy solution, which was evacuated at 150° C. until the cloudy solution became a clear solution, followed by keeping the clear solution at 80° C., thereby obtaining a solution containing the precursor of Zn (0.5 M).

3. Preparation of a Solution Containing a Precursor of Se

Se powder (50 mmol) and 25 mL of TOP were mixed to form a cloudy solution, which was heated to 80° C. until the cloudy solution became a clear solution, followed by cooling to room temperature, thereby obtaining a solution containing a precursor of Se (2.0 M).

4. Preparation of a Solution Containing a Precursor of S

S powder (50 mmol) and 25 mL of TOP were mixed to form a cloudy solution, which was heated to 80° C. until the cloudy solution became a clear solution, followed by cooling to room temperature, thereby obtaining a solution containing a precursor of S (2.0 M).

5. Preparation of a NH$_4$F Etchant Solution

NH$_4$F powder (10 mmol) and 50 mL of methanol were mixed by stirring at room temperature until the NH$_4$F powder was dissolved in the methanol, thereby obtaining a NH$_4$F etchant solution (0.2 M).

Preparation of InP—InP/ZnSe/(ZnSe/ZnS) Core-Inner Shell-First Outer Shell-Second Outer Shell Semiconductor Quantum Dot Structures First, In(OAc)$_3$ (1 mmol), OA (3 mmol) and ODE (5 mL) were mixed in a three-neck round-bottom flask (flask volume: 50 mL) to form a cloudy solution, which was evacuated at 150° C. until the cloudy solution became a clear solution. After filling the three-neck round-bottom flask with nitrogen gas, (TMS)$_3$P (0.5 mmol) and TOP (1.0 mL) were added into the clear solution to form a first mixture solution, followed by heating the first mixture solution at a heating rate of 20° C./min to and then kept at 260° C. for 2 minutes, so as to form seed crystals of InP in the first mixture solution. Next, 10 mL of the solution containing the precursor of In and the precursor of P was continuously injected into the first mixture solution at a flow rate of 10 mL/hour for 60 minutes to form a second mixture solution, so as to grow a plurality of core layers of InP respectively on the seed crystals of InP, thereby obtaining a plurality of InP/InP cores. Thereafter, 90 μL of the solution containing the precursor of Se (2.0 M) and 800 μL of the solution containing the precursor of Zn (0.5 M) were injected into the second mixture solution containing the InP/InP cores to form a third mixture solution, so as to grow a plurality of inner shell layers of ZnSe respectively on a plurality of oxygen-inactive areas on the surface of each of the core layers of InP, followed by cooling, thereby obtaining the third mixture solution containing the InP/InP cores with the inner shell layers of ZnSe respectively formed thereon.

After that, 9.0 mL of the third mixture solution containing the InP/InP cores with the inner shell layers of ZnSe respectively formed thereon, 2.8 mL of the NH$_4$F etchant solution (0.2 M) and 72 mL of acetone were mixed by stirring at room temperature for 15 minutes to form a fourth mixture solution, so as to allow the NH$_4$F etchant solution to etch away oxide layers formed on the oxygen-reactive areas on the surface of each of core layers of InP. Then, the fourth mixture solution was subjected to centrifugation treatment conducted at a speed of 5000 rpm for 3 minutes so as to collect the InP/InP cores with the inner shell layers of ZnSe respectively formed thereon, followed by dispersing the thus collected InP/InP cores with the inner shell layers of ZnSe respectively formed thereon in 5 mL of ODE. Thereafter, 1.0 mL of OA was added to the ODE containing the InP/InP cores with the inner shell layers of ZnSe respectively formed thereon so as to form a fifth mixture solution, followed by heating the fifth mixture solution at 180° C. for 1 hour so as to remove any NH$_4$F etchant residue present on the core layers of InP.

Meanwhile, Zn(OAc)$_2$ (3.318 mmol), OA (6.636 mmol) and ODE (5 mL) were mixed in another three-neck round-bottom flask (flask volume: 50 mL) to form a cloudy solution, which was evacuated at 150° C. until the cloudy solution became a clear solution containing a precursor of Zn. After filling the another three-neck round-bottom flask with nitrogen gas, the fifth mixture solution containing the InP/InP cores with the inner shell layers of ZnSe respectively formed thereon were injected into the clear solution containing the precursor of Zn so as to form a sixth mixture solution. Then, 71 μL of the solution containing the precursor of Se (2.0 M) were injected into the sixth mixture solution to form a seventh mixture solution, followed by heating the seventh mixture solution to 280° C. During the heating process, once the seventh mixture solution was heated to 270° C., the solution containing the precursor of Se (2.0 M) was continuously injected into the seventh mixture solution at an injection rate of 5.25 mL/hour for 15 minutes to form an eight mixture solution, so as to grow a plurality of first outer shell layers of ZnSe respectively on the inner shell layers of ZnSe and the core layers of InP. Then, after the eight mixture solution was heated to 300° C., the solution containing the precursor of S (2.0 M) was continuously injected into the eight mixture solution at an injection rate of 2.9 mL/hour for 60 minutes to form a ninth mixture solution, so as to grow a plurality of second outer shell layers of ZnS respectively on the first outer shell layers of ZnSe.

Figure 19:
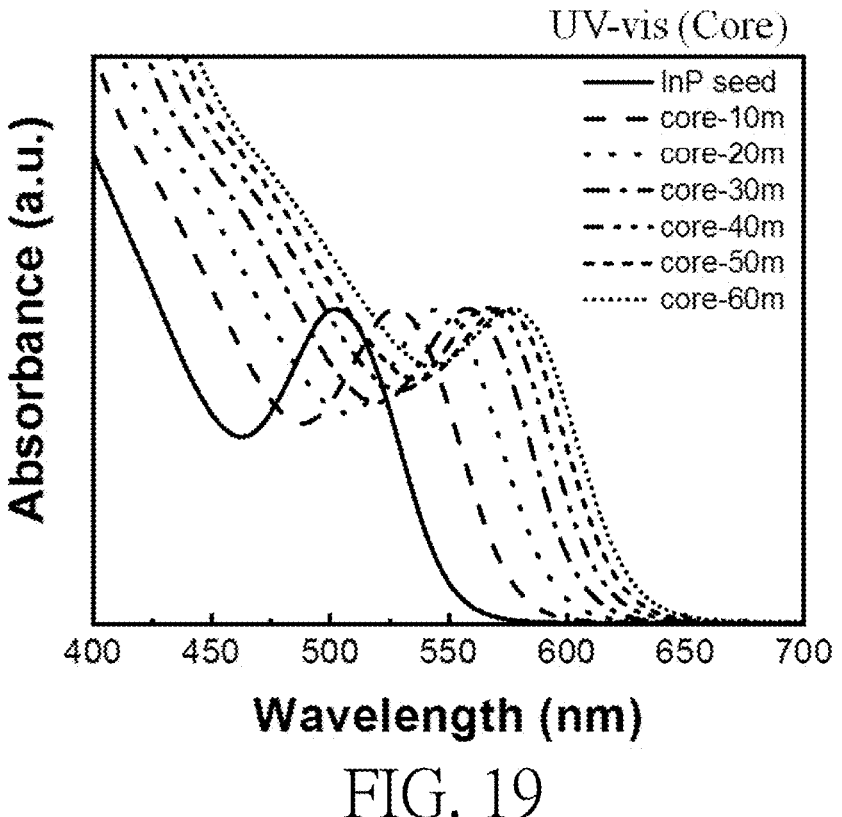
FIG. 19 is an UV-vis absorption spectrum of the InP—InP cores of the semiconductor quantum dot structures of Comparative Example 2 (CE2), illustrating wavelengths of absorption peaks of the InP seed crystal and InP/InP seed crystal-core layer over increased time period of growth.
Figure 20:
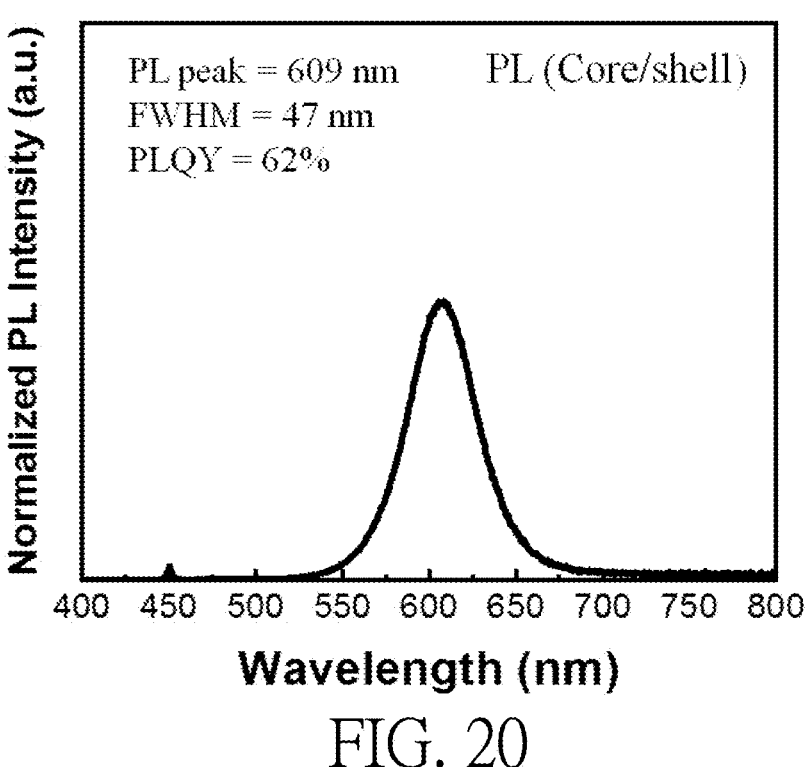
FIG. 20 is a photoluminescence spectrum illustrating emission peak wavelength, FWHM value, and quantum yield of the InP—InP/ZnSe/(ZnSe/ZnS) core-inner shell-first outer shell-second outer shell semiconductor quantum dot structures of CE2.

Referring to FIG. 19, the UV-vis absorption spectrum of the InP—InP cores of CE2 shows that during a time period for growing the core layers of InP respectively on the seed crystals of InP, the absorption peaks thereof shifted to have greater wavelengths of the visible light range. However, referring to the photoluminescence spectrum shown in FIG. 20, the quantum yield of the InP—InP/ZnSe/(ZnSe/ZnS) core-inner shell-first outer shell-second outer shell semiconductor quantum dot structures of CE2 is only 62% despite having an emission peak wavelength of 609 nm and an FWHM of emission peak of approximately 47 nm. To be specific, although extending the time period for growing the core layers of InP may lead to the increase in the overall size of the InP—InP cores of the semiconductor quantum dot structures of CE2 so as to increase absorption thereof in the visible light range, the semiconductor quantum dot structures of CE2 still have a relatively low quantum yield of only 62% because growth of the core layers of InP on the respective seed crystals of InP was conducted in the second mixture solution that contained a large amount of oxygen for a relatively long time period of growth (i.e., 60 minutes), resulting in eventual formation of oxide layers on areas of the surface of each of the core layers of InP which are usually not reactive with oxygen. In comparison with the InP:Se/ZnSe/ZnS core-inner shell-outer shell semiconductor quantum dot structures of EX6 which has a relatively high quantum yield, even in consideration that the FWHM of emission peak is not required to be narrow, the quality of the InP—InP/ZnSe/(ZnSe/ZnS) core-first inner shell-second inner shell-outer shell semiconductor quantum dot structures of CE2 still needs to be improved due to the relatively low quantum yield thereof.

In summary, in the method for making semiconductor quantum dot structures of the present disclosure, by simultaneously adding the additional solution containing the precursor of M1, the additional solution containing the precursor of C1, and the first diluted fluoride-containing etchant to grow the core layers 22 of M1C1 respectively on the seed crystals 21 of M1C1, the oxide layer formed on each of the second regions 212 of the seed crystals 21 of M1C1 which are easily reactive with oxygen can be etched by the first diluted fluoride-containing etchant during growth of the core layers 22 of M1C1, and the oxide layer formed on each of the areas on the surface of each of the core layers 22 of M1C1 which are easily reactive with oxygen can also be etched by the first diluted fluoride-containing etchant while the thickness of each of the core layers 22 of M1C1 increases during growth thereof. As such, the probability of the core layers 22 of M1C1 being oxidized is reduced, and thus, the semiconductor quantum dot structures of the present disclosure have a high quantum yield. In addition, the risk of danger caused by toxic gas released from the first diluted fluoride-containing etchant can be greatly reduced since the concentration and the amount thereof used for growing the core layers 22 of M1C1 are low. Moreover, since the barrier layers 23 are respectively grown on the core layers 22 of M1C1, diffusion of group II and group VI elements of the shell 3 of M2C2 into the core layer 22 of M1C1 and diffusion of group Ill and group V elements of the core layer 22 of M1C1 into the shell 3 of M2C2 can be avoided during nucleation and growth of the cores 2 at a high temperature for a long time period, so that the semiconductor quantum dot structures of the present disclosure have a high quantum yield and an FWHM of emission peak that is narrow.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A semiconductor quantum dot structure, comprising:
a core (2) including,
  a seed crystal (21) made of a first compound M1C1 and having a crystal surface, said crystal surface having a plurality of first regions (211) and a plurality of second regions (212), each of said first regions (211) being inactive with oxygen, each of said second regions (212) being easily reactive with oxygen,
  a core layer (22) which is grown on said seed crystal (21), which is made of said first compound M1C1, and which has a plurality of first areas (221) and a plurality of second areas (222), each of said first areas (221) being positioned on a corresponding one of said first regions (211) of said crystal surface, each of said second areas (222) being positioned on a corresponding one of said second regions (212) of said crystal surface, each of said first areas (221) having a thickness that is greater than that of each of said second areas (222), and
  a barrier layer (23) which is grown on said core layer (22) and which is made of a second compound selected from the group consisting of M1X1 and X2C1; and
a shell (3) which is grown on said barrier layer (23) to enclose the core (2), and which is made of a third compound M2C2,
wherein
M1 is a group Ill element selected from the group consisting of Al, Ga, In, and combinations thereof, and C1 is a group V element selected from the group consisting of P, As, and a combination thereof,
X1 is an element selected from the group consisting of N, As, S, Se, Te, F, Cl, Br, and I, and X2 is an element selected from the group consisting of Na, K, Cs, Mg, Cu, Zn, Cd, Hg, Al, Ga, and Pb, and
M2 is a group II element selected from the group consisting of Zn, Cd, and a combination thereof, and C2 is a group VI element selected from the group consisting of S, Se, O, Te, and combinations thereof.

2. The semiconductor quantum dot structure as claimed in claim 1, wherein said seed crystal (21) has a particle size ranging from 1.5 nm to 4.5 nm, said core layer (22) has an average thickness ranging from 0.1 nm to 1.0 nm, and said barrier layer (23) has a thickness ranging from 0.1 nm to 1.0 nm.

3. The semiconductor quantum dot structure as claimed in claim 2, which has a particle size ranging from 6 nm to 20 nm.

4. The semiconductor quantum dot structure as claimed in claim 1, wherein said first compound M1C1 of each of said seed crystal (21) and said core layer (22) is InP, said third compound M2C2 of said shell (3) being one of ZnSe, ZnSeS, ZnS, and combinations thereof, X1 of said second compound being Se, and X2 of said second compound being Zn or Cd.

5. The semiconductor quantum dot structure as claimed in claim 4, wherein in said seed crystal (21), each of said first regions (211) has a crystal plane of {111}, and each of said second regions (212) has at least one of crystal planes of {311}, {220}, and {200}.

6. The semiconductor quantum dot structure as claimed in claim 4, wherein said shell (3) has a layered structure including an inner shell layer (31) and an outer shell layer (32), said third compound M2C2 of said inner shell layer (31) being one of ZnSe and ZnSeS, said third compound M2C2 of said outer shell layer (32) being ZnS.

7. The semiconductor quantum dot structure as claimed in claim 6, wherein said third compound M2C2 of said inner shell layer (31) is ZnSeS.

8. The semiconductor quantum dot structure as claimed in claim 7, wherein Se and S are distributed in said inner shell layer (31) of ZnSeS formed on said barrier layer (23) in a gradient manner in a direction away from said seed crystal (21) of InP, or are evenly distributed to form an alloy with Zn in said inner shell layer (31) of ZnSeS formed on said barrier layer (23).

9. A method for making semiconductor quantum dot structures, comprising the steps of:

(a) mixing a solution containing a precursor of M1 with a solution containing a precursor of C1 to form a first mixture solution;

(b) heating the first mixture solution to a first temperature not lower than a nucleation temperature of a first compound M1C1 for a first predetermined time period so as to form a plurality of seed crystals (21) of the first compound M1C1 in the first mixture solution, each of the seed crystals (21) having a crystal surface that has a plurality of first regions (211) and a plurality of second regions (212), each of the first regions (211) being inactive with oxygen, each of the second regions (212) being oxidized by oxygen present in the first mixture solution so as to form an oxide layer thereon;

(c) forming a second mixture solution by continuously adding an additional solution containing the precursor of M1, an addition solution containing the precursor of C1, and a first diluted fluoride-containing etchant into the first mixture solution obtained after step (b) for a second predetermined time period, while keeping at the first temperature, so as to permit the oxide layer formed on each of the second regions (212) of the seed crystals (21) to be etched by the first diluted fluoride-containing etchant, and so as to grow a plurality of core layers (22) of the first compound M1C1 respectively on the seed crystals (21), each of the core layers (22) having a plurality of first areas (221) and a plurality of second areas (222), the first areas (221) of each of the core layers (22) being respectively grown on the first regions (211) of a corresponding one of the seed crystals (21), the second areas (222) of each of the core layers (22) being respectively grown on the second regions (212) of a corresponding one of the seed crystals (21), each of the first areas (221) having a thickness greater than that of each of the second areas (222), the first diluted fluoride-containing etchant having a concentration ranging from 1 vol % to 5 vol % and a volume ranging from 0.1 mL to 2.0 mL;

(d) forming a third mixture solution by continuously adding a solution containing a precursor of X1 or a solution containing a precursor of X2 into the second mixture solution obtained after step (c) for a third predetermined time period so as to allow growth of a plurality of barrier layers (23) respectively on the core layers (22), thereby obtaining, in the third mixture solution, a plurality of cores (2) each including one of the seed crystals (21), a corresponding one of the core layers (22) and a corresponding one of the barrier layers (23), each of the barrier layers (23) being made of a second compound selected from the group consisting of M1X1 and X2C1;

(e) removing the cores (2) from the third mixture solution and dispersing the cores (2) in a clear solution including a precursor of M2 so as to obtain a clear solution including the cores (2) and the precursor of M2; and (f) heating the clear solution including the cores (2) and the precursor of M2 to a second temperature not lower than a nucleation temperature of a third compound M2C2, and then adding a solution containing a precursor of C2, so as to grow a plurality of shells (3) respectively on the barrier layers (23) of the cores (2), thereby obtaining the semiconductor quantum dot structures each including one of the cores (2) and a corresponding one of the shells (3), wherein M1 is a group Ill element selected from the group consisting of Al, Ga, In, and combinations thereof; and C1 is a group V element selected from the group consisting of P, As, and a combination thereof, X1 is an element selected from the group consisting of N, As, S, Se, Te, F, Cl, Br, and I; and X2 is an element selected from the group consisting of Na, K, Cs, Mg, Cu, Zn, Cd, Hg, Al, Ga, and Pb, and M2 is a group II element selected from the group consisting of Zn, Cd, and a combination thereof; and C2 is a group VI element selected from the group consisting of S, Se, O, Te, and combinations thereof.

10. The method as claimed in claim 9, between steps (e) and (f), further comprising the step:

(e1) adding a second-diluted fluoride-containing etchant into the clear solution containing the precursor of M2 and the cores (2) so as to remove an oxide layer formed on a surface of each of the barrier layers (23) of the cores (2).

11. The method as claimed in claim 10, wherein each of the first diluted fluoride-containing etchant and the second diluted fluoride-containing etchant includes a compound selected from the group consisting of HF, ZnF, and NH$_4$F.

12. The method as claimed in claim 10, wherein the first predetermined time period in step (b) is not greater than 60 minutes, the second predetermined time period in step (c) ranges from 1 minute to 40 minutes, and the third predetermined time period in step (d) ranges from 1 minute to 40 minutes.

13. The method as claimed in claim 10, wherein in step (c), the first diluted fluoride-containing agent is added into the first mixture solution at a flow rate ranging from 0.15 mL/hour to 3.0 mL/hour.

14. The method as claimed in claim 10, wherein in step (e1), the second-diluted fluoride-containing etchant has a concentration ranging from 1 vol % to 10 vol %, and is added in an amount ranging from 0.05 mL to 1.0 mL into the clear solution containing the precursor of M2 and the cores (2).

15. The method as claimed in claim 10, wherein the first compound M1C1 of each of the seed crystals (21) and the core layers (22) is InP, the third compound M2C2 of each of the shells (3) being one of ZnSe, ZnSeS, ZnS, and combinations thereof, X1 of the second compound being Se, and X2 of the second compound being Zn or Cd.

16. The method as claimed in claim 15, wherein in each of the seed crystals (21), each of the first regions (211) has a crystal plane of {111}, and each of the second regions (212) has at least one of the crystal planes of {311}, {220}, and {200}.

17. The method as claimed in claim 15, wherein:

in step (e), the precursor of M2 in the clear solution is a precursor of Zn;

in step (f), the precursor of C2 in the solution includes a precursor of Se and a precursor of S;

each of the shells (3) includes an inner shell layer (31) and an outer shell layer (32); and step (f) includes the following sub-steps in order:

(f1) adding at the nucleation temperature of the third compound, a solution containing the precursor of Se into the clear solution containing the precursor of Zn and the cores (2) to form a fourth mixture solution, such that in the fourth mixture solution, Se in the precursor of Se completely reacts with Zn in the precursor of Zn to allow growth of the inner shell layer (31) of ZnSe on each of the barrier layers (23) of the cores (2); and (f2) adding at the nucleation temperature of the third compound, a solution containing the precursor of S into the fourth mixture solution to form a fifth mixture solution, such that in the fifth solution mixture, S in the precursor of S completely reacts with Zn in the precursor of Zn to allow growth of the outer shell layer (32) of ZnS on the inner shell layer (31) of ZnSe.

18. The method as claimed in claim 15, wherein:

in step (e), the precursor of M2 in the clear solution is a precursor of Zn;

in step (f), the precursor of C2 in the solution includes a precursor of Se and S, and a precursor of S;

each of the shells (3) includes an inner shell layer (31) and an outer shell layer (32); and step (f) further includes the following sub-steps in order:

(f1) adding at the nucleation temperature of the third compound, a solution containing the precursor of Se and S into the clear solution containing the precursor of Zn and the cores (2) to form a fourth mixture solution, such that in the fourth solution mixture, Se and S in the precursor of Se and S completely react with Zn in the precursor of Zn to allow growth of the inner shell layer (31) of ZnSeS on each of the barrier layers (23) of the cores (2); and (f2) adding at the nucleation temperature of the third compound, a solution containing the precursor of S into the fourth mixture solution to form a fifth mixture solution, such that in the fifth mixture solution, S in the precursor of S completely reacts with Zn in the precursor of Zn to allow growth of the outer shell layer (32) of ZnS on the inner shell layer (31) of ZnSeS.

19. The method as claimed in claim 18, wherein in sub-step (f1), a molar ratio of Se to S in the fourth mixture solution is 2:1, and Se and S in the inner shell layer (31) of ZnSeS formed on each of the barrier layers (23) are distributed in a gradient manner in a direction away from a corresponding one of the seed crystals (21) of InP.

20. The method as claimed in claim 18, wherein in sub-step (f1), a molar ratio of Se to S in the fourth mixture solution is 1:1, and Se and S are evenly distributed to form an alloy with Zn in the inner shell layer (31) of ZnSeS formed on each of the barrier layers (23).

* * * * *